(12) United States Patent
Hanzawa et al.

(10) Patent No.: US 8,478,454 B2
(45) Date of Patent: Jul. 2, 2013

(54) VEHICLE MOVEMENT CONTROL APPARATUS AND VEHICLE MOVEMENT CONTROL METHOD

(75) Inventors: Masatoshi Hanzawa, Kariya (JP); Yuichi Mizutani, Aichi-ken (JP); Hirofumi Nitta, Obu (JP); Mitsuhiro Tokimasa, Obu (JP); Yasuhiko Mukai, Anjyo (JP); Junpei Tatsukawa, Chiryu (JP)

(73) Assignees: Advics Co., Ltd, Kariya-Shi, Aichi-Ken (JP); Aisin Seiki Kabushiki Kaisha, Kariya-Shi, Aichi-Ken (JP); Denso Corporation, Kariya-Shi, Aichi-Ken (JP)

( * ) Notice: Subject to any disclaimer, the term of this patent is extended or adjusted under 35 U.S.C. 154(b) by 74 days.

(21) Appl. No.: 13/282,603

(22) Filed: Oct. 27, 2011

(65) Prior Publication Data
US 2012/0109412 A1 May 3, 2012

(30) Foreign Application Priority Data

Oct. 29, 2010 (JP) .................................. 2010-243936

(51) Int. Cl.
*G05D 1/00* (2006.01)
(52) U.S. Cl.
USPC ........................................................... 701/1

(58) Field of Classification Search
USPC ............................................................ 701/1
See application file for complete search history.

(56) References Cited

U.S. PATENT DOCUMENTS 6,205,375 B1 * 3/2001 Naito ................. 701/1
6,374,162 B1 * 4/2002 Tanaka et al. ..................... 701/1

FOREIGN PATENT DOCUMENTS
JP 2009-137582 A 6/2009

* cited by examiner

*Primary Examiner* — James P Trammell
*Assistant Examiner* — Michael D Lang
(74) *Attorney, Agent, or Firm* — Buchanan Ingersoll & Rooney PC

(57) ABSTRACT

A vehicle movement control apparatus for setting control requirement values for a plurality of control objects controlling movement of a vehicle, if control target values for movement of the vehicle are input, the apparatus includes: a first requirement value setting unit setting a first control requirement value for a first control object; a first estimating unit acquiring a first movement estimated value if the first control object is activated based on the first control requirement value; a calculating unit calculating an estimated delay amount which is a shortage amount generated based on response delay of the first control object; a second requirement value setting unit setting a second control requirement value for a second control object, based on the result of the calculation; and a second estimating unit acquiring a second movement estimated value if the second control object is activated based on the second control requirement value.

14 Claims, 11 Drawing Sheets

VEHICLE MOVEMENT CONTROL APPARATUS AND VEHICLE MOVEMENT CONTROL METHOD

CROSS REFERENCE TO RELATED APPLICATIONS

This application is based on and claims priority under 35 U.S.C. §119 to Japanese Patent Application 2010-243936, filed on Oct. 29, 2010, the entire content of which is incorporated herein by reference.

BACKGROUND

1. Field of the Invention

The present invention relates to a vehicle movement control apparatus and a vehicle movement control method for controlling movement of a vehicle by activating a plurality of control objects provided in the vehicle.

2. Description of Related Art

Conventionally, with respect to an integrated system for integratedly controlling a plurality of actuators capable of controlling movement of a vehicle, for example, there has been proposed the integrated system disclosed in JP-A-2009-137582. The integrated system includes a first activating device (a first control object) and a second activating device (a second control object). The first activating device has a first actuator among the actuators, and a first control unit controlling the first actuator. The second activating device has a second actuator among the actuators, and a second control unit controlling the second actuator.

The integrated system further includes an advisor unit and an agent unit. The advisor unit generates a degree of risk for an operation characteristic of a vehicle, based on information about an environment (a friction resistance value ($\mu$ value) of a road surface, outdoor temperature, or others) around the vehicle or information about a driver (a degree of fatigue of a driver), and outputs it to each of the control objects. The agent unit generates information to realize automatic driving (e.g., lane keeping) of a vehicle and outputs the information to each of the control objects.

Each of the control objects adjusts a control requirement value, based on various information from the advisor unit and the agent unit. Based on the adjusted control requirement value, activation of the actuator included in each of the control objects is controlled.

SUMMARY

However, JP-A-2009-137582 conceptually discloses adjusting the control requirement values for the control objects based on various information from the advisor unit, the agent unit, and others. JP-A-2009-137582 does not disclose a specific method for setting the control requirement values.

The present invention has been made in consideration of the circumstances, and its object is to provide a vehicle movement control apparatus and a vehicle movement control method, which are capable of properly setting control requirement values for a plurality of control objects for controlling movement of the vehicle.

To achieve the object, a vehicle movement control apparatus according to an aspect of the disclosure for setting control requirement values for a plurality of control objects capable of controlling movement of a vehicle, if control target values for movement of the vehicle are input, comprises: a first requirement value setting unit configured to set a first control requirement value for a first control object of the control objects; a first estimating unit configured to acquire a first movement estimated value obtained by numerically expressing movement of the vehicle if the first control object is activated based on the set first control requirement value; a calculating unit configured to calculate at least an estimated delay amount among a stationary shortage amount, which is a shortage amount, to the control target value, generated due to limit of output of the first control object, and the estimated delay amount, which is a shortage amount generated based on response delay of the first control object; a second requirement value setting unit configured to set a second control requirement value for a second control object among the control objects, based on the result of the calculation by the calculating unit; and a second estimating unit configured to acquire a second movement estimated value obtained by numerically expressing movement of the vehicle if the second control object is activated based on the set second control requirement value.

According to the above configuration, a first control requirement value for a first control object is set based on an input control target value. Accordingly, a first movement estimated value, which is obtained by numerically expressing movement of a vehicle when the first control object is activated based on the first control requirement value, is acquired. Simultaneously, among a stationary shortage amount and an estimated delay amount, at least the estimated delay amount is calculated. The "stationary shortage amount" is a value corresponding to a control amount that cannot be theoretically output to the first control object, with respect to a control target value. The "estimated delay amount" is a value corresponding to a control amount generated based on response delay of the first control object. A second control requirement value for a second control object is set based on at least the estimated delay amount among the stationary shortage amount and the estimated delay amount that have been calculated. That is, the second control requirement value is set to a value supplementing a control amount that cannot be responded in the first control object, with respect to an input control target value. Accordingly, it is possible to properly set control requirement values for the plurality of control objects for controlling movement of a vehicle.

Once the second control requirement value is set, a second movement estimated value, which is obtained by numerically expressing movement of a vehicle when the second control object is activated based on the second control requirement value, is acquired. And, it is possible to make a result of sum of the first movement estimated value and the second movement estimated value approach the input control target value. That is, the first and second control objects are incorporated with each other, such that movement of a vehicle can approach ideal movement.

In the vehicle movement control apparatus, the calculating unit: subtracts a first control requirement value set by the first requirement value setting unit from the control target value, and makes a value based on the subtraction result be the stationary shortage amount; and subtracts a first movement estimated value acquired by the first estimating unit from the first control requirement value set by the first requirement value setting unit, and makes a value based on the subtraction result be the estimated delay amount.

According to the above configuration, the first control requirement value for the control object is subtracted from the input control target value, and the stationary shortage amount is set to a value based the subtraction result. The first movement estimated value that has been estimated based on the first control requirement value is subtracted from the first control requirement value for the first control object, and the estimated delay amount is set to a value based on the subtraction result. Based on the stationary shortage amount and the estimated delay amount that have been set, the second control requirement value for the second control object is set.

The present invention includes the case where the stationary shortage amount is 'zero (0).' In the above vehicle movement control apparatus, the calculating unit: calculates the stationary shortage amount based on a differential value between the control target value and an output limit value of the first control object; and calculates the estimated delay amount based on a differential value between a smaller value of the output limit value of the first control object and the control target value, and the first movement estimated value acquired by the first estimating unit.

According to the above configuration, the stationary shortage amount is set to a value based on a maximum value that can be output by the input control target value and the first control object, namely, a differential value from an output limit value. The estimated delay amount is set to a value based on a differential value between an output limit value of the first control object and the first movement estimated value. Based on the stationary shortage amount and the estimated delay amount that have been set, the second control requirement value for the second control object is set.

The first control object preferably includes an actuator for adjusting movement of a vehicle. The output limit value of the first control object may be set based on a maximum value of an output value that can be output by the actuator included in the first control object. There is a case where control of output to the first control object is required in accordance with a vehicle driving circumference. In this case, the output limit value of the first control object may be set, based on a maximum value of an output value that can be output by the actuator in the controlled state.

In the above vehicle movement control apparatus, the calculating unit: makes the stationary shortage amount be 'zero (0)' and calculates the estimated delay amount based on a differential value between the control target value and the first movement estimated value acquired by the first estimating unit, in the case where the output limit value of the first control object can exceed the final target value of the control target value; and calculates the estimated delay amount based on a differential value between a smaller value of the output limit value of the first control object and the control target value, and the first movement estimated value acquired by the first estimating unit, in the case where the output limit value of the first control object cannot exceed the final target value of the control target value.

According to the above configuration, in the case where a maximum value that can be output by the first control object, i.e., the output limit value can exceed a final target value of a control target value, it may be understood that the stationary shortage amount is not generated. As such, the stationary shortage amount is set to 'zero (0),' and the estimated delay amount is calculated based on a differential value between the control target value and the first movement estimated value. In the case where the output limit value of the first control object cannot exceed the final target value of the control target value, the stationary shortage amount is generated. As such, the stationary shortage amount is calculated based on a differential value between the output maximum value and the control target value, and the estimated delay amount is calculated based on a differential value between the maximum output value and the first movement estimated value. The second control requirement value is set based on the stationary shortage amount and the estimated delay amount that have been calculated.

The above vehicle movement control apparatus further comprises a coefficient setting unit configured to set a correction coefficient, which is more than or equal to 'zero (0)' and less than or equal to '1,' wherein the coefficient setting unit: acquires a final target value of a first control requirement value to be required to the first control object, which is activated upon input of the control target value, and sets, in the case where a differential value between the final target value of the first control requirement value and the first movement estimated value acquired by the first estimating unit is small, the correction coefficient to a value smaller than that in the case where the differential value is large, and the second requirement value setting unit corrects the estimated delay amount calculated by the calculating unit, based on the set correction coefficient, and sets a second control requirement value based on the estimated delay amount after the correction and the stationary shortage amount calculated by the calculating unit.

The second control requirement value is set based on the estimated delay amount caused by response delay of the first control object. As such, when the first control object can be sufficiently output, there is a case where a summed value of the first movement estimated value and the second movement estimated value overshoots a final target value of the first control requirement value. The 'final target value of the first control requirement value' means the first control requirement value, in which a differential value from a starting value of the first control requirement value upon starting control of the first control object, involved in setting the control target value, becomes a maximum value. The 'starting value of the first control requirement value' and the 'final target value of the first control requirement value' are changed at timing when a control direction is converted from a first direction to a second direction.

In the present invention, when a differential value between the final target value of the first control requirement value and the first movement estimated value becomes small, a correction coefficient is set to a value smaller than that in the case where the differential value is large. Based on the set correction coefficient, the estimated delay amount is corrected (adjusted). Based on the corrected estimated delay amount, the second control requirement value is set. As a result, the second control requirement value is corrected, before the summed value of the first movement estimated value and the second movement estimated value reaches the control target value. Accordingly, compared to the case where no correction coefficient is provided, it is possible to restrain the summed value of the first movement estimated value and the second movement estimated value from overshooting the control target value.

The above vehicle movement control apparatus further comprises a coefficient setting unit configured to set the correction coefficient, which is more than or equal to 'zero (0)' and less than or equal to '1,' wherein the coefficient setting unit sets, in the case where a differential value between a smaller value of the final target value of the control target value and the output limit value of the first control object, and the first movement estimated value acquired by the first estimating unit is small, the correction coefficient to a value smaller than that in the case where the differential value is large; and the second requirement value setting unit: corrects the estimated delay amount calculated by the calculating unit by using the correction coefficient set by the coefficient setting unit, and sets the second control requirement value based on the estimated delay amount after the correction.

The second control requirement value is set based on the estimated delay amount caused by response delay of the first control object. As such, when the first control object can be sufficiently output, there is a case where the summed value of the first movement estimated value and the second movement estimated value overshoots the control target value. In the present invention, when a differential value between a small value of the final target value of the control target value and the output limit value of the first control object and the first movement estimated value becomes small, the correction coefficient is set to a value smaller than the case where the differential value is large. Based on the set correction coefficient, the estimated delay amount is corrected (adjusted). Based on the corrected estimated delay amount, the second control requirement value is set. As a result, the second control requirement value is corrected, before the summed value of the first movement estimated value and the second movement estimated value reaches the control target value. Accordingly, compared to the case where correcting the estimated delay amount by using the correction coefficient is not carried out, it is possible to restrain the summed value of the first movement estimated value and the second movement estimated value from overshooting the control target value.

In the above vehicle movement control apparatus, the coefficient setting unit maintains the correction coefficient, in the case where the first movement estimated value acquired by the first estimating unit is a value between the control target value and the first control requirement value set by the first requirement value setting unit.

There is a case where the input control target value drastically varies. For example, the control target value may vary from a plus value to a minus value, or becomes a value close to 'zero (0).' There is a case where when the control target value drastically varies, the first movement estimated value becomes a value between the control target value and the first control requirement value. In this case, the correction coefficient set by using the final target value of the first control requirement value or the control target value drastically increases in accordance with the variation of the control target value. As a result, there is a case where the estimated delay amount that has been corrected by using the correction coefficient drastically varies in an opposite direction to a direction, in which the control target value varies. For example, if the control target value has been set from a plus value to a minus value, the estimated delay amount may increase, despite the minus value of the control target value. In this case, if the stationary shortage amount is small, the second control requirement value may increase. As a result, a vehicle exhibits movement opposite to the input control target value, thereby causing significant anxiety to a person who takes in the vehicle.

In the present invention, if the first movement estimated value becomes a value between the control target value and the first control requirement value, the correction coefficient does not vary. Accordingly, it is possible to restrain the second control requirement value from varying in an opposite direction to a direction, in which the control target value varies. Accordingly, even in the case where a direction to control movement of a vehicle varies, or a control amount drastically varies, the possibility that a vehicle exhibits movement opposite to the input control target value can be reduced.

In the vehicle movement control apparatus, the second requirement value setting unit corrects a second control requirement value such that an absolute value becomes small, in the case where a summed value of the movement estimated values acquired by the estimating unit overshoots the control target value.

According to the above configuration, in the case where the summed value of the movement estimated values overshoots the control target value, the second control requirement value is corrected to reduce an absolute value. Accordingly, it is possible to reduce the overshoot amount, and make movement of a vehicle approach ideal movement.

The above vehicle movement control apparatus further comprises: another calculating unit configured to calculate at least an estimated delay amount among a stationary shortage amount, which is a shortage amount, to the control target value, generated due to limit of output of each of the first and second control objects, and the estimated delay amount generated based on response delay of each of the first and second control objects, and a third requirement value setting unit configured to set a third control requirement value for a third control object among the control objects based on the result of the calculation by the calculating unit.

According to the above configuration, a third control requirement value for a third control object is set based on at least the estimated delay mount among the stationary shortage amount for the control target value generated by limit of output of the first and second control objects and the estimated delay amount generated based on response delay of the first and second control objects. That is, the third control requirement value is set to a value supplementing a control amount that cannot be responded in the first and second control objects, with respect to the input control target value. Accordingly, the third control object is added to and cooperated with the first and second control objects, so that it is possible to make movement of a vehicle approach ideal movement.

In the vehicle movement control apparatus, the calculating unit: makes a summed result of the output limit values of the first and second control objects be a first summed value, and calculates the stationary shortage amount based on a differential value between the first summed value and the control target value, makes a summed value of the first movement estimated value acquired by the first estimating unit and the second movement estimated value acquired by the second estimating unit be a second summed value, and calculates the estimated delay amount based on a differential value between a smaller value of the control object value and the first summed value, and the second summed value.

According to the above configuration, a first summed value is calculated based on a maximum output value of the first and second control objects. Based on a differential value between the first summed value and the control target value, the stationary shortage amount is calculated. Based on the first movement estimated value and the second movement estimated value, a second summed value is calculated. Based on a differential value between the second summed value and the control target value, the estimated delay amount is calculated. Based on the stationary shortage amount and the estimated delay amount that have been calculated, a third control requirement value is set.

The above vehicle movement control apparatus further comprises another coefficient setting unit configured to set a correction coefficient, which is more than or equal to 'zero (0)' and less than or equal to '1,' the coefficient setting unit sets, in the case where a differential value between a small value of the final target value of the control target value and the first summed value, and the second summed value is small, a correction coefficient to a value smaller than that in the case where the differential value is large, and the third requirement value setting unit corrects the estimated delay amount calculated by the calculating unit, based on the correction coefficient set by the coefficient setting unit, and sets a third control requirement value based on the estimated delay amount after the correction.

The third control requirement value is set based on the estimated delay amount caused by response delay of the first and second control objects. As such, when the first and second control objects can be sufficiently output, there is a case where an output value output by the cooperation of the three control objects overshoots the control target value. In the present invention, when a differential value between a smaller value of the final target value of the control target value and the first summed value, and the second summed value becomes small, the correction coefficient is set to a value smaller than that in the case where the differential value is large. Based on the set correction coefficient, the estimated delay amount is corrected (adjusted). Based on the corrected estimated delay amount, the third control requirement value is set. Accordingly, compared to the case where no correction coefficient is provided, it is possible to restrain the output value output by the cooperation of the three control objects from overshooting the control target value.

In the vehicle movement control apparatus, the third requirement setting unit corrects a third control requirement value such that an absolute value becomes small, in the case where a summed value of the movement estimated values acquired by the estimating unit overshoots the control target value.

According to the configuration, in the case where the summed value of the movement estimated values overshoots the control target value, the third control requirement value is corrected to reduce the absolute value. Accordingly, it is possible to reduce the overshoot amount, and make movement of a vehicle approach ideal movement.

In the vehicle movement control apparatus, the control target value is a value set to move the vehicle in a lateral direction, and the control objects are control objects capable of applying a force for moving the vehicle in a lateral direction to the vehicle.

In case of controlling movement of a vehicle in a forward and backward direction, in particular, in case of accelerating a vehicle, an activating source represented by an engine, a motor, or others is activated. In case of decelerating a vehicle, a braking source represented by a brake actuator is activated. That is, in case of controlling movement of a vehicle in a forward and backward direction, the plurality of control objects are rarely cooperated with one another. In controlling movement of a vehicle in a lateral direction, a control object capable of separately adjusting a control object for adjusting a steering angle of a wheel of the vehicle or a braking/activating force for each wheel of the vehicle is used. Each of the control objects is effective even in the case where the vehicle is moved in a rightward direction and in the case where the vehicle is moved in a leftward direction. Accordingly, in the present invention, movement of a vehicle is controlled by using the plurality of control objects effective for controlling movement of a vehicle in a lateral direction. A proper control requirement value for each of the control objects is set, so that it is possible to properly control movement of a vehicle in the lateral direction.

A vehicle movement control method according to the aspect of the invention for controlling movement of a vehicle by setting control requirement values for a plurality of control objects capable of controlling movement of the vehicle, upon input of a control target value for movement of the vehicle, the method comprises: setting a first control requirement value for a first control object among the control objects, acquiring a first movement estimated value obtained by numerically expressing movement of the vehicle if the first control object is activated based on the first control requirement value, calculating at least an estimated delay amount among a stationary shortage amount, which is a shortage amount, to the control target value, generated due to limit of output of the first control object and the estimated delay amount generated based on response delay of the first control object, setting a second control requirement value for a second control object among the control objects, based on the calculated result, and acquiring the second movement estimated value obtained by numerically expressing movement of the vehicle if the second control object is activated based on the second control requirement value.

According to the above configuration, it is possible to accomplish operation and effects equal to those of the vehicle movement control apparatus that has been described.

DESCRIPTION OF EXEMPLARY EMBODIMENTS

First Embodiment

Hereinafter, embodiments of the present invention, which are realized as a movement control apparatus and a movement control method for controlling movement of a vehicle in a lateral direction, will be described with reference to FIGS. 1 to 12. In the descriptions hereinafter, a direction, in which a vehicle moves forward (advancing direction), is a forward direction (vehicle forward).

Figure 1:
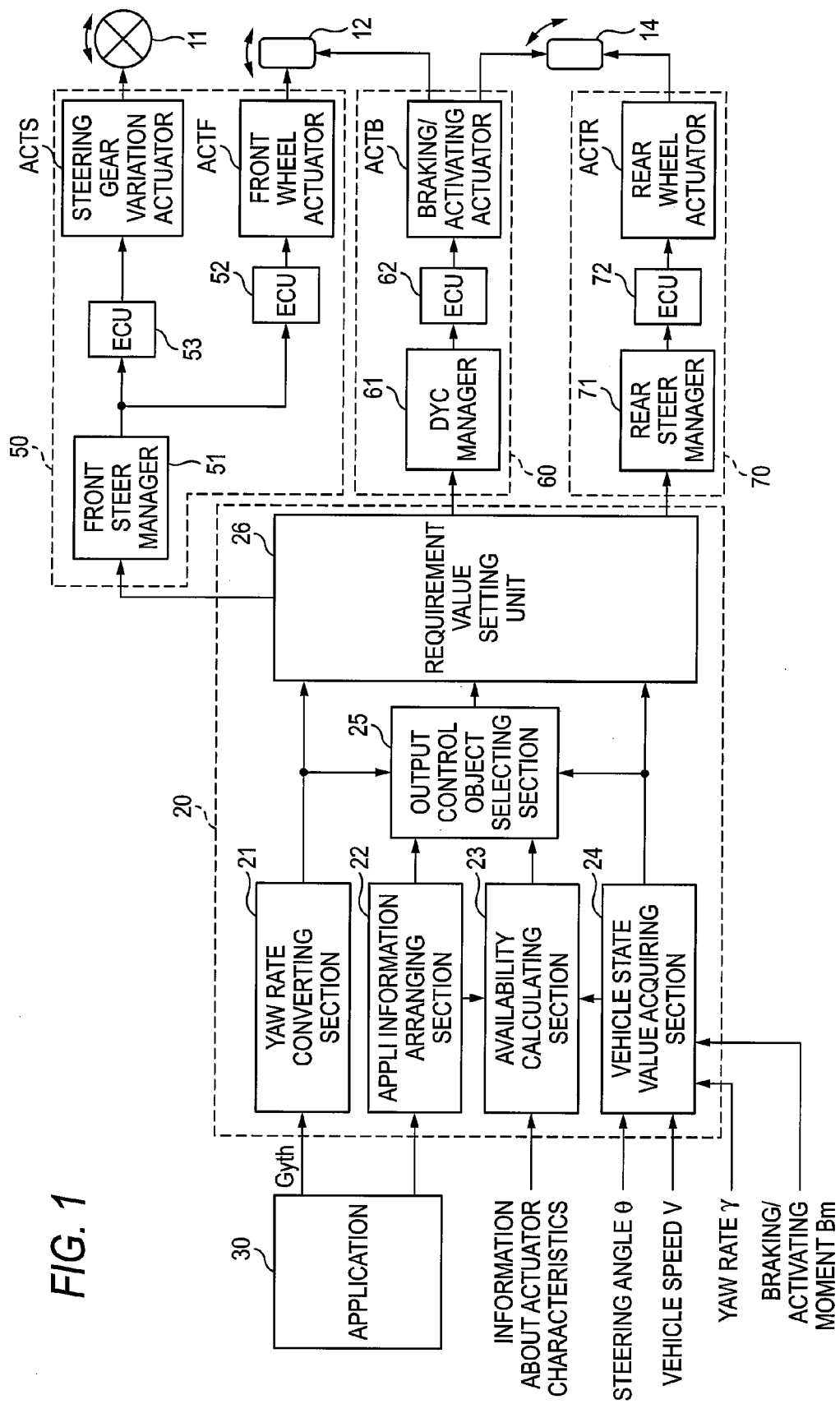
FIG. 1 is a block diagram showing general configuration of a vehicle provided with a vehicle movement control apparatus.

FIG. 1 is a block diagram showing configuration required to control movement of a vehicle in a lateral direction. As illustrated in FIG. 1, a vehicle of the first embodiment includes a first activating device 50 (a control object), which is activated when a tire angle of front wheels 12 is adjusted, a second activating device 60 (a control object), which is activated when a braking/activating force to each of wheels (including the front wheels 12 and rear wheels 14) is adjusted, a third activating device 70 (a control object), which is activated when a tire angle of the rear wheels 14 is adjusted. The first activating device 50 is provided with a front wheel actuator ACTF for adjusting a tire angle of the front wheels 12 and a steering gear variation actuator ACTS for adjusting a gear ratio of a steering 11, by rotating the steering 11 provided in the inside of the vehicle. The first activating device 50 is also provided with a front steer manager 51, ECU (Electronic Control Unit) 52 for controlling the front wheel actuator ACTF based on a control command from the front steer manager 51, and ECU 53 for controlling the steering gear variation actuator ACTS.

The second activating device 60 includes a braking/activating actuator ACTB, which is activated when a braking/activating force to each of the wheels 12 and 14 is separately adjusted. The second activating device 60 is provided with a DYC (Dynamic Yaw-Rate Controller) manager 61, and ECU 62 for controlling the barking/activating actuator ACTB based on a control command from the DYC manager 61. Examples of the braking/activating actuator ACTB include a brake actuator or a power train.

The third activating device 70 includes a rear wheel actuator ACTR, which is activated when a tire angle of the rear wheels 14 is adjusted. The third activating device 70 is provided with a rear steer manager 71, and ECU 72 for controlling the rear wheel actuator ACTR based on a control command from the rear steer manager 71.

The vehicle of the first embodiment is provided with a controller 20, which is a movement control apparatus for separately setting control requirement values for at least two activating devices among the activating devices 50, 60, and 70, and outputting the control requirement values to the managers of the corresponding activating devices. A control target value output from an application 30, and information about a vehicle state detected based on detection signals from various sensors (e.g., a steering angle sensor for detecting a steering angle of the steering 11) provided in the vehicle are input into the controller 20. Also, characteristics of the actuators ACTF, ACTB, and ACTR, namely, characteristics of the activating devices 50, 60, and 70 are input from the managers 51, 61, and 71 of the activating devices 50, 60, and 70 into the controller 20.

The vehicle of the first embodiment is equipped with a plurality of vehicle movement control functions such as ACC (Adaptive Cruise Control) and lane keeping. The application 30 is provided for each of the movement control functions. A control target value required to effectuate the movement control functions, and information (hereinafter, it may be referred to as 'required appli information') required to accomplish the movement control functions (e.g., circumferences of a road surface) is output from the application 30 to the controller 20.

For example, the application 30 for lane keeping determines whether there is departure or possibility of departure of a vehicle from a lane by using a vehicle mounted camera (not illustrated) or others. If it is determined that there is departure or possibility of departure of a vehicle from a lane, the application 30 sets target lateral acceleration (a control target value) Gyth required to restore the position of the vehicle, and outputs the target lateral acceleration Gyth to the controller 20. While FIG. 1 illustrates one application 30, the vehicle actually has a plurality of applications.

Figure 2A:
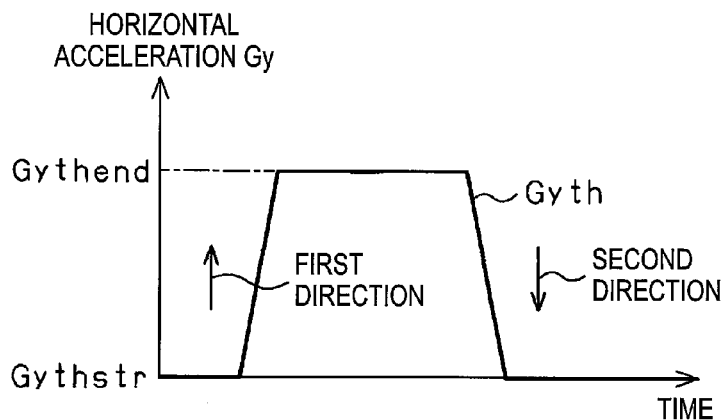
FIGS. 2A and 2B are graphs showing examples for movement of a vehicle required from an application.

FIG. 2A is a graph showing one example of the target lateral acceleration Gyth output from the application 30. As illustrated in FIG. 2A, the target lateral acceleration Gyth is changed from a starting value Gythstr (e.g., 'zero (0)') prior to starting control of movement of a vehicle required by the application 30 to the first direction (e.g., a direction in which the vehicle is rotated rightward), so that the target lateral acceleration Gyth becomes an arrival target value of lateral acceleration Gythend. Thereafter, the target lateral acceleration Gyth is changed from the target value lateral acceleration Gythend to the second direction (e.g., a direction in which the vehicle is rotated leftward) opposite to the first direction, so that the target lateral acceleration Gyth becomes the starting value Gythstr.

As to the information about a vehicle state, as illustrated in FIG. 1, information required for movement of the vehicle in a lateral direction, i.e., information required to generate yaw in the vehicle is input into the controller 20. For example, a steering angle θ of the steering 11, a vehicle speed V of a vehicle (it may be referred to as a 'vehicle body speed'), a yaw rate γ of a vehicle, and a braking/activating moment Bm are input into the controller 20. The 'braking/activating moment Bm' indicates a moment in a direction of yaw generated in the vehicle when the braking/activating actuator ACTB applies a braking/activating force to each of the vehicle wheels 12 and 14.

The 'information about characteristics of an actuator' includes an output limit value of each of the actuators ACTF, ACTB, and ACTR. The output limit value is a maximum value of an output value that can be output by the actuators. In the first embodiment, the output limit value of each of the activating devices 50, 60, and 70, which are the control objects, is the output limit value of each of the actuators ACTF, ACTB, and ACTR included in the activating devices 50, 60, and 70. In the first embodiment, the first activating device 50 including the front steer manager 51 is set as the first control object, the second activating device 60 including the DYC manager 61 is set as the second control object, and the third activating device 70 including the rear steer manager 71 is set as the third control object, by an output control object selecting section 25, which will be described hereafter.

Figure 3:
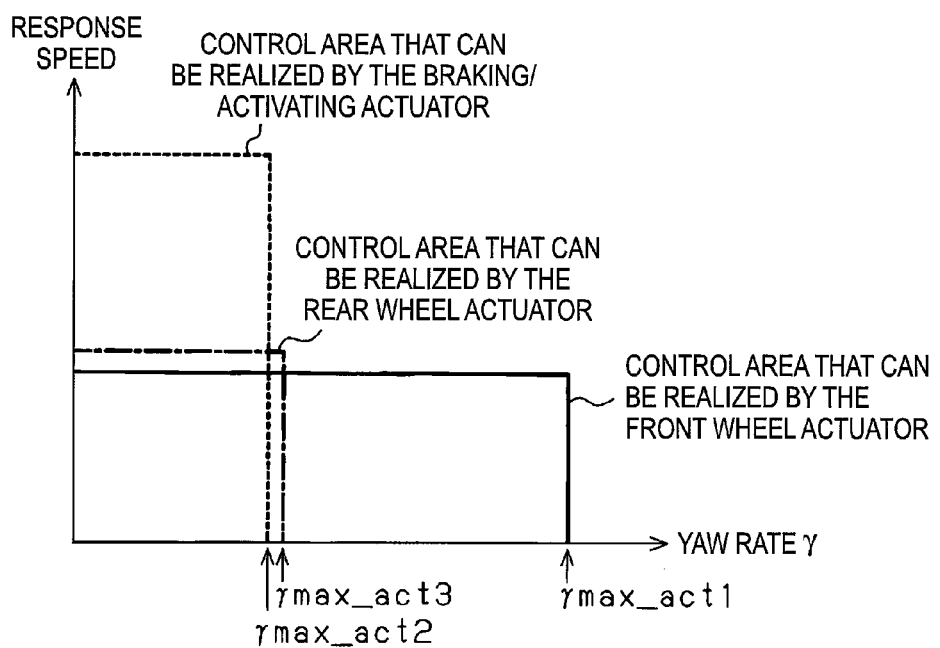
FIG. 3 is a map showing a relation between an output limit value and a response speed of each control object.

As illustrated in FIG. 3, characteristics of each of the actuators ACTF, ACTB, and ACTR to generate lateral acceleration (or a yaw rate $\gamma$) in the vehicle are different with one another. For example, an output limit value $\gamma max\_act1$ of a yaw rate $\gamma$ of the front wheel actuator ACTF (the output limit value of the first control object) is the largest in the actuators ACTF, ACTB, and ACTR. A response speed of the front wheel actuator ACTF is most slowly in the actuators ACTF, ACTB, and ACTR. An output limit value $\gamma max\_act2$ of a yaw rate $\gamma$ of the braking/activating actuator ACTB (the output limit value of the second control object) is the smallest in the actuators ACTF, ACTB, and ACTR. A response speed of the braking/activating actuator ACTB is the fastest in the actuators ACTF, ACTB, and ACTR. An output limit value $\gamma max\_act3$ of a yaw rate $\gamma$ of the rear wheel actuator ACTR (the output limit value of the third control object) is the second-largest in the actuators ACTF, ACTB, and ACTR. A response speed of the rear wheel actuator ACTR is the second-fastest in the actuators ACTF, ACTB, and ACTR.

Figure 5A:
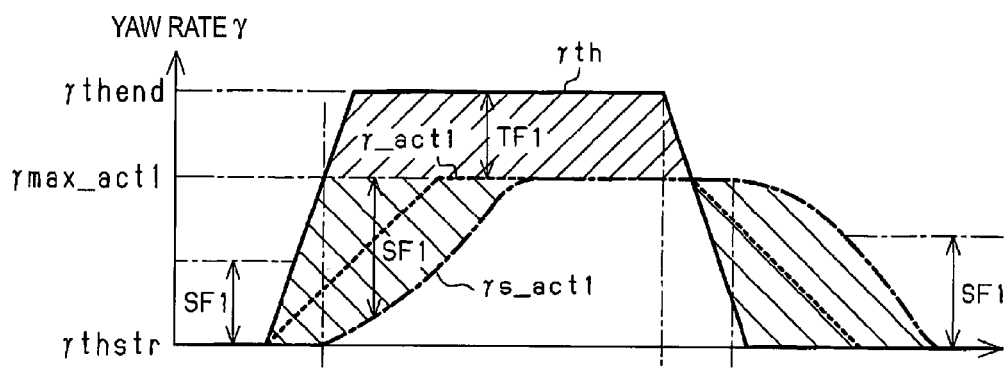
FIG. 5A is a timing chart showing variation of a control target value required from an application, a first control requirement value for a first control object, and a first movement estimated value of the first control object.

The 'information about characteristics of an actuator' includes an upper limit value for a degree of variation in the control requirement values for the activating devices. Here, an upper limit value for a degree of variation in the control requirement value for the first activating device 50 will be described with reference to FIG. 5A. FIG. 5A illustrates a first requirement yaw rate $\gamma\_act1$, which is the control requirement value for the first activating device 50, by using a dashed line, and an target yaw rate $\gamma th$, which corresponds to the control target value set by the application 30, by using a solid line. As illustrated in FIG. 5A, inclination of the dashed line, which presents the target yaw rate $\gamma th$ at an initial stage for starting control, is smaller than inclination of the solid line, which presents the first requirement yaw rate $\gamma\_act1$. This is because in the case where the first activating device 50 is activated to make a first yaw rate estimated value $\gamma s\_act1$ presented by an alternated long and short dash line in FIG. 5A drastically vary, movement of the vehicle may be instable. As such, even if drastic variation of the lateral acceleration Gy (or a yaw rate $\gamma$) is required by the application 30, the variation amount of the control requirement value for the first activating device 50 does not overshoot a predetermined amount corresponding to an upper limit value.

Although the first activating device 50 has been described in this regard, upper limits corresponding to characteristics of the actuators are provided also for variation amounts of the control requirement values for the other activating devices 60 and 70, respectively.

Subsequently, the controller 20 will be described. As illustrated in FIG. 1, the controller 20 is a functional section accomplished in the manner that CPU (not illustrated) executes a predetermined program, and includes a yaw rate converting section 21, an appli information arranging section 22, an availability calculating section 23, a vehicle state value acquiring section 24, an output control object selecting section 25, and a requirement value setting section 26.

Since the controller 20 carries out setting various parameters by using a yaw rate, the yaw rate converting section 21 converts a value input from the application 30 into a yaw rate. For example, if the target lateral acceleration Gyth is input from the application 30, the yaw rate converting section 21 converts the target lateral acceleration Gyth into an target yaw rate $\gamma th$ by using a known calculation method, and outputs the target yaw rate $\gamma th$ to the output control object selecting section 25 and the requirement value setting section 26. If a control target value input from the application 30 is a yaw rate, the yaw rate converting section 21 outputs the control target value input from the application 30 to the output control object selecting section 25 and the requirement value setting section 26.

Figure 2B:
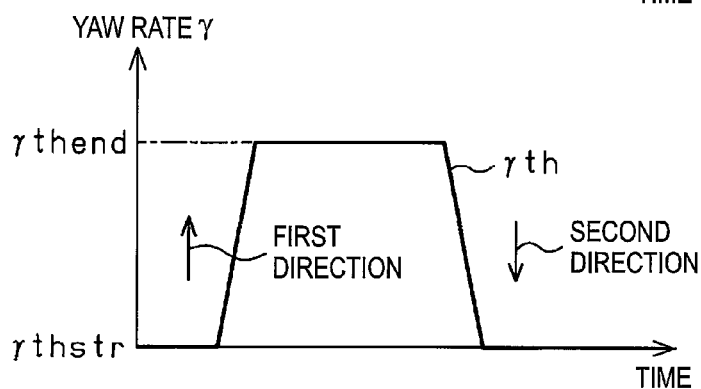

FIG. 2B is a graph showing an example in the case where the target lateral acceleration Gyth output from the application 30 as illustrated in FIG. 2A is converted into an target yaw rate $\gamma th$. As illustrated in FIG. 2B, the target yaw rate $\gamma th$ is changed from the starting value $\gamma thstr$ (e.g., 'zero (0)') prior to starting control of movement of the vehicle required by the application 30 to the first direction, so that the target yaw rate $\gamma th$ becomes an arrival target value of yaw rate $\gamma thend$. Thereafter, the target yaw rate $\gamma th$ is changed from the arrival target value of yaw rate $\gamma thend$ to the second direction, so that the target yaw rate $\gamma th$ becomes the starting value $\gamma thstr$.

Returning to FIG. 1, the appli information arranging section 22 arranges necessary appli information input from the application 30. The appli information arranging section 22 outputs information necessary for the processing in the output control object selecting section 25 to the output control object selecting section 25.

The availability calculating section 23 calculates output limit values $\gamma max\_act1$, $\gamma max\_act2$, and $\gamma max\_act3$ of the activating devices 50, 60, and 70 to generate a yaw rate in the vehicle, i.e., output limit values of the control objects, and others, based on the information about the input characteristics of the actuators ACTF, ACTB, and ACTR. The availability calculating section 23 outputs the calculation result to the output control object selecting section 25.

The vehicle state value acquiring section 24 converts an input steering angle $\theta$ of the steering 11 into a yaw rate (hereinafter, it may be referred to as a "yaw rate corresponding to a steering angle"), and calculates a slip angle of the vehicle body. The vehicle state value acquiring section 24 outputs the braking/activating moment Bm, the vehicle speed V, the yaw rate corresponding to a steering angle, and the slip angle of the vehicle body to the output control object selecting section 25 and the requirement value setting section 26. The 'slip angle of the vehicle body' is an angle between the forward and backward direction of the vehicle body and the advancing direction of the vehicle body.

The output control object selecting section 25 selects an activating apparatus to be used, based on various information input from the functional sections. If a plurality of activating devices are used, the output control object selecting section 25 sets priorities of the activating devices. In the first embodiment, the activating devices to be used are the first activating device 50 for adjusting a tire angle of the front wheels 12, the second activating device 60 for generating a braking/activating moment by separately adjusting a braking/activating force to each of the vehicle wheels 12 and 14, and the third activating device 70 for adjusting a tire angle of the rear wheels 14. The first control object having the highest priority is the first activating device 50. The second control object having the second-highest priority is the second activating device 60. The third control object having the lowest priority is the third activating device 70. The set priorities are merely exemplary. The first control object may be the second activating device 60. The second control object may be the third activating device 70. The third control object may be the first activating device 50.

The output control object selecting section 25 outputs the determined contents, i.e., the information about the priorities of the activating devices 50, 60, and 70, and others to the requirement value setting section 26.

Subsequently, the requirement value setting section 26 will be described.

Figure 4:
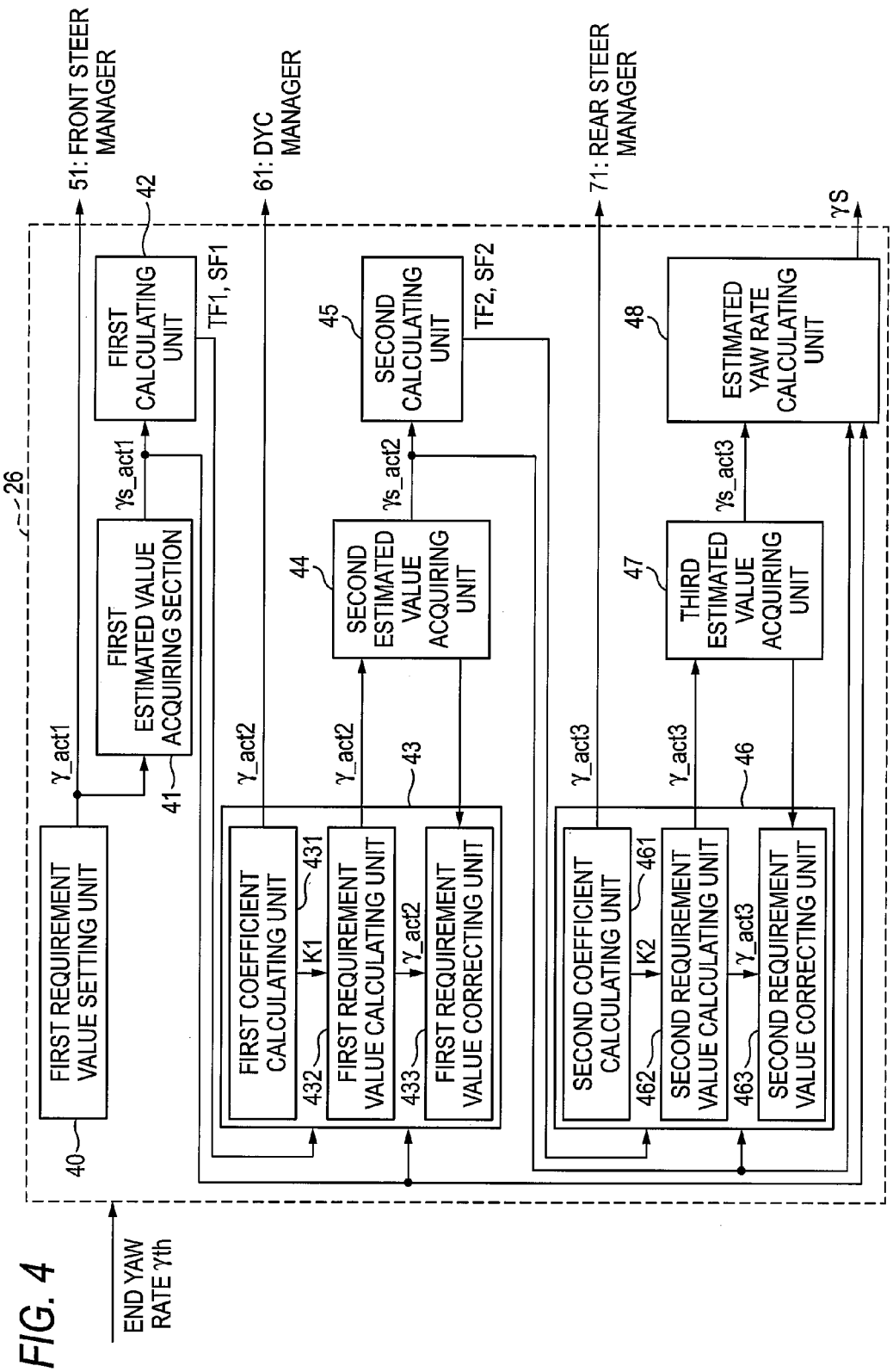
FIG. 4 is a block diagram showing a controller setting a control requirement value for each control object.

As illustrated in FIG. 1, the requirement value setting section 26 sets a control requirement value to be required to each of the activating devices 50, 60, and 70, based on the various information from the yaw rate converting section 21, the vehicle state value acquiring section 24, and the output control object selecting section 25. The requirement value setting section 26 outputs the set control requirement values to the managers 51, 61, and 71 of the activating devices 50, 60, and 70. As illustrated in FIG. 4, the requirement value setting section 26 has a first requirement setting section 40, a first estimated value acquiring section 41, a first calculating section 42, a second requirement value setting section 43, a second estimated value acquiring section 44, a second calculating section 45, a third requirement value setting section 46, a third estimated value acquiring section 47, and an estimated yaw rate calculating section 48.

The first requirement value setting section 40 sets a first control requirement value to be required to the first control object, in order to accomplish the movement of the vehicle required by the application 30. In the first embodiment, the first requirement value setting section 40 sets the first control requirement value to be required to the first control object, such that if possible, the requirement from the application 30 is responded in the first control object. Specifically, the first requirement value setting section 40 sets a first requirement yaw rate (the first control requirement value) $\gamma\_act1$ to be required to the front steer manger 51, in order to make a yaw rate $\gamma$ of the vehicle approach an target yaw rate $\gamma th$ input from the yaw rate converting section 21. The first requirement value setting section 40 outputs the set first requirement yaw rate $\gamma\_act1$ to the front steer manager 51 and the first estimated value acquiring section 41. Accordingly, in the first embodiment, the first requirement value setting section 40 functions as a first requirement value setting unit.

The first estimated value acquiring section 41 acquires a first movement estimated value (it may be referred to as a 'reference'), which is obtained by numerically expressing movement of the vehicle when the first control object is activated based on the first control requirement value set by the first requirement value setting section 40. In the first embodiment, the first estimated value acquiring section 41 acquires the first yaw rate estimated value (the first movement estimated value)$\gamma s\_act1$ as an estimated value of a yaw rate generated in the vehicle, when the first activating device 50 is activated based on the first requirement yaw rate $\gamma\_act1$ set by the first requirement value setting section 40. The first yaw rate estimated value $\gamma s\_act1$ is estimated based on information output from the vehicle state value acquiring section 24. For example, the first yaw rate estimated value $\gamma s\_act1$ in case of a high vehicle speed V becomes a value larger than that in case of a low vehicle speed V. This is because if a tire angle of the front wheels 12 is constant, the vehicle can be quickly rotated as the vehicle speed V is high. Accordingly, in the first embodiment, the first estimated value acquiring section 41 functions as a first estimating unit. The first estimated value acquiring section 41 outputs the acquired first yaw rate estimated value $\gamma s\_act1$ to the first calculating section 42, the second requirement value setting section 43, and the estimated yaw rate calculating section 48. As illustrated in FIG. 5A, the first yaw rate estimated value $\gamma s\_act1$ is inconsistent with the first requirement yaw rate $\gamma\_act1$. This is because response of the front wheel actuator ACTF to a control command from the front steer manager 51 is late.

Returning to FIG. 4, the first calculating section 42 calculates a first stationary shortage amount TF1, which is a shortage amount generated to the control target value due to shortage of output of the first control object, and a first estimated delay amount SF1, which is generated based on response delay of the first control object. The first calculating section 42 outputs the first stationary shortage amount TF1 and first estimated delay amount SF1 that have been calculated, to the second requirement value setting section 43. Accordingly, in the first embodiment, the first calculating section 42 functions as a calculating unit. The first stationary shortage amount TF1 is a shortage amount to the target yaw rate $\gamma th$ generated by limit of output of the front wheel actuator ACTF, i.e., a control amount that cannot be accomplished in the front wheel actuator ACTF. In the first embodiment, as illustrated in FIG. 5A, the first stationary shortage amount TF1 is a value obtained by subtracting the output limit value $\gamma max\_act1$ of the front wheel actuator ACTF (the output limit value of the first control object) from the target yaw rate $\gamma th$. The first stationary shortage amount TF1 may be a value obtained by multiplying a predetermined coefficient by the value obtained by subtracting the output limit value $\gamma max\_act1$ from the target yaw rate $\gamma th$ or a value obtained by summing a predetermined value to the subtracted value.

The method of calculating the first estimated delay amount SF1 is different in the case where the first stationary shortage amount TF1 is not 'zero (0)' and in the case where the first stationary shortage amount TF1 is 'zero (0).' As illustrated in FIG. 5A, in the case where the first stationary shortage amount TF1 is not 'zero (0),' the first estimated delay amount SF1 is a value obtained by subtracting the first yaw rate estimated value $\gamma s\_act1$ from a smaller value among the output limit value $\gamma max\_act1$ of the front wheel actuator ACTF (the output limit value of the first control object) and the target yaw rate $\gamma th$. Specifically, since the target yaw rate $\gamma th$ is smaller than the output limit value $\gamma max\_act1$, prior to a first timing t11 illustrated in FIG. 5A, a value obtained by subtracting the first yaw rate estimated value $\gamma s\_act1$ from the target yaw rate $\gamma th$ or a value close to the value obtained by the subtraction is the first estimated delay amount SF1. Since the output limit value $\gamma max\_act1$ is smaller than the target yaw rate $\gamma th$, after the first timing t11, a value obtained by subtracting the first yaw rate estimated value $\gamma s\_act1$ from the output limit value $\gamma max\_act1$ or a value close to the value obtained by the subtraction is the first estimated delay amount SF1.

Figure 6A:
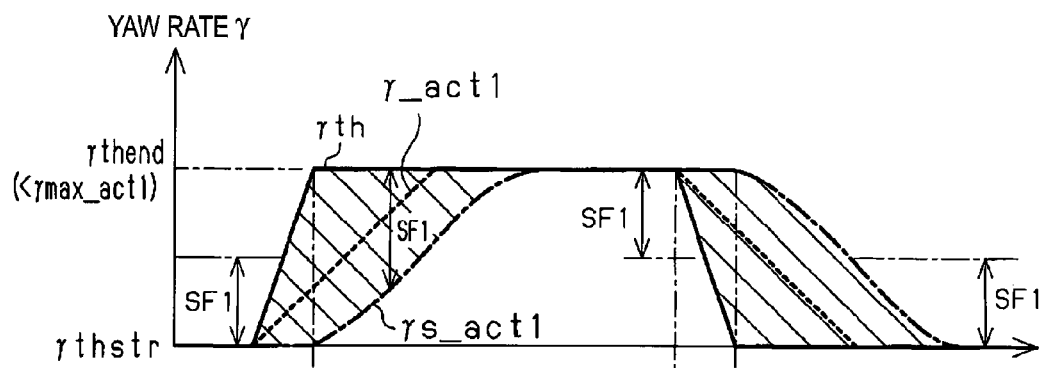
FIG. 6A is a timing chart showing variation of a control target value required from an application, a first control requirement value for a first control object, and a first movement estimated value of the first control object.

As illustrated in FIG. 6A, in the case where the first stationary shortage amount TF1 is 'zero (0),' the first estimated delay amount SF1 is a value obtained from subtracting the first yaw rate estimated value $\gamma s\_act1$ from the target yaw rate $\gamma th$ or a value close to the value obtained by the subtraction.

Returning to FIG. 4, the second requirement value setting section 43 has a first coefficient calculating section 431, a first requirement value calculating section 432, and a first requirement value correcting section 433. The first coefficient calculating section 431 calculates a first correction coefficient K1 used to correct (adjust) the input first estimated delay amount SF1, and outputs the first correction coefficient K1 to the first requirement value calculating section 432. The first correction coefficient K1 is a so-called gain set to a value more than or equal to 'zero (0)' and less than or equal to '1.' Accordingly, in the first embodiment, the first coefficient calculating section 431 functions as a coefficient setting unit.

The method of calculating the first correction coefficient K1 is different in the case where the first stationary shortage amount TF1 is not 'zero (0)' and in the case where the first stationary shortage amount TF1 is 'zero (0).' As illustrated in FIG. 5A, in the case where the first stationary shortage amount TF1 is not 'zero (0),' the output limit value γmax_act1 of the front wheel actuator ACTF (the output limit value of the first control object) is smaller than the arrival target value γthend of the target yaw rate γth. As such, the first correction coefficient K1 becomes a value based on a differential value between the output limit value γmax_act1 of the front wheel actuator ACTF (the output limit value of the first control object) and the first estimated delay amount SF1, prior to a second timing t12 when a direction to be controlled is completely converted from the first direction (refer to FIGS. 2A and 2B) into the second direction (refer to FIGS. 2A and 2B). After the second timing t12, the first correction coefficient K1 becomes a value based on a differential value between the first estimated delay amount SF1 and the starting value γthstr. Specifically, the first correction coefficient K1 is calculated based on the relation expression (math expression 1) set forth hereinafter. In the relation expression (math expression 1), values substituted in a control starting value Vstr and a final target value Vend are different prior to and after the second timing t12 illustrated in FIGS. 5A and 5B.

$$K1 = \frac{|Vend - \gamma s\_act1|}{|Vend - Vstr|}$$ [Math Expression 1]

Control prior to the second timing t12 is control to change a yaw rate γ of the vehicle from the starting value γthstr to the arrival target value γthend. As such, prior to the second timing t12, the starting value γthstr is substituted in the control starting value Vstr, and the output limit value γmax_act1 of the front wheel actuator ACTF (the output limit value of the first control object) is substituted in the final target value Vend. Control after the second timing t12 is control to change a yaw rate γ of the vehicle from the output limit value γmax_act1 (or a value close to the output limit value γmax_act1) to the starting value γthstr. As such, after the second timing t12, the output limit value γmax_act1 is substituted in the control starting value Vstr, and the starting value γthstr is substituted in the final target value Vend.

Figure 5B:
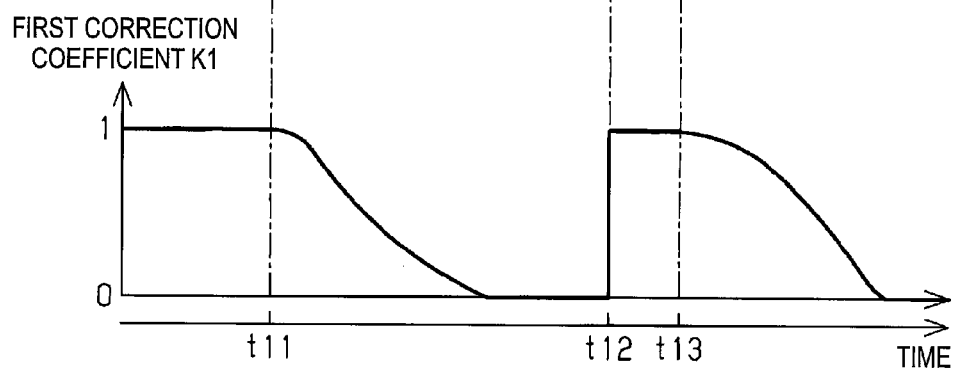
FIG. 5B is a timing chart showing variation of a first correction coefficient for correcting a second control requirement value.

As illustrated in FIGS. 5A and 5B, the front wheel actuator ACTF is not yet activated prior to the first timing t11 due to response delay. Thus, the first correction coefficient K1 prior to the second timing t12 is set to '1.' Once the front wheel actuator ACTF begins to be activated, the first correction coefficient K1 gradually becomes close to 'zero (0).' The first correction coefficient K1 after the second timing t12 is set to '1' prior to a third timing t13 when the front wheel actuator ACTF begins to be activated such that the first yaw rate estimated value γs_act1 becomes smaller than the output limit value γmax_act1. After the third timing t13, the first correction coefficient K1 gradually becomes small as the first yaw rate estimated value γs_act1 is divorced from the output limit value γmax_act1. When the first yaw rate estimated value γs_act1 reaches the starting value γthstr of the target yaw rate γtl, the first correction coefficient K1 is set to 'zero (0).'

In the case where the first stationary shortage amount TF1 is 'zero (0),' the first correction coefficient K1 becomes a value based on a differential value between the control target value and the first estimated delay amount, as illustrated in FIG. 6A. Specifically, the first correction coefficient K1 is calculated based on the aforementioned relation expression (math expression 1). In the relation expression (math expression 1), values substituted in the control starting value Vstr and the final target value Vend are different prior to and after a second timing t22 illustrated in FIG. 6A. The second timing t22 is a timing when a direction to be controlled is completely converted from the first direction (refer to FIGS. 2A and 2B) to the second direction (refer to FIGS. 2A and 2B).

Control prior to the second timing t22 is control to change a yaw rate γ of the vehicle from the starting value γthstr to the arrival target value γthend. As such, prior to the second timing t22, the starting value γthstr is substituted in the control starting value Vstr, and the arrival target value γthend is substituted in the final target value Vend. Control after the second timing t22 is control to change a yaw rate γ of the vehicle from the arrival target value γthend (or a value close to the arrival target value γthend) to the starting value γthstr. As such, after the second timing t22, the arrival target value γthend is substituted in the control starting value Vstr, and the starting value γthstr is substituted in the final target value Vend.

Figure 6B:
FIG. 6B is a timing chart showing variation of a first correction coefficient for correcting a second control requirement value.

As illustrated in FIGS. 6A and 6B, the front wheel actuator ACTF is not yet activated prior to the first timing t21 due to response delay. Thus, the correction coefficient K1 prior to the second timing t22 is set to '1.' When the front wheel actuator ACTF begins to be activated, the first correction coefficient K1 gradually becomes close to 'zero (0).' When the first yaw rate estimated value γs_act1 reaches the arrival target value γthend of the target yaw rate γth, the first correction coefficient K1 becomes 'zero (0).' The first correction coefficient K1 after the second timing t22 is set to '1' prior to a third timing t23 when the actuator ACTF begins to be actuated such that the first yaw rate estimated value γs_act1 becomes smaller than the arrival target value γthend of the target yaw rate γth. After the third timing t23, the first correction coefficient K1 gradually becomes small as the first yaw rate estimated value γs_act1 becomes close to the starting value γthstr. When the first yaw rate estimated value γs_act1 reaches the starting value γthstr of the target yaw rate γth, the first correction coefficient K1 becomes 'zero (0).'

Returning to FIG. 4, the first requirement value calculating section 432 sets a second control requirement amount to be required to the second control object, based on at least the first estimated delay amount SF1 among the first stationary shortage amount TF1 and the first estimated delay amount SF1 that have been input from the first calculating section 42, and the input first correction coefficient K1. That is, the second control requirement amount is set to supplement a part of a required control target value that cannot be achieved by output from the first control object by using output from the second control object. In the first embodiment, the first requirement value calculating section 432 calculates a second requirement yaw rate γ_act2 (the second control requirement amount) to be required to the second activating device 60 based on the relation expression (math expression 2) set forth hereinafter. The first requirement value calculating section 432 outputs the calculated second requirement yaw rate γ_act2 to the second estimated value acquiring section 44. In the relation expression (math expression 2), the multiplier n is an integer more than '1,' or may be '1' or a number (e.g., '3') other than '1.'

$$\gamma\_act2 = TF1 + SF1 \times Kr \qquad \text{[Math Expression 2]}$$

Figure 7A:
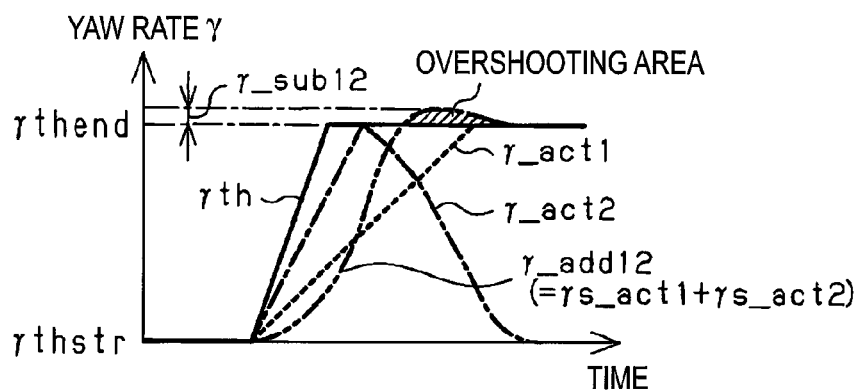
FIG. 7A is a timing chart to explain that a summed value of movement estimated values of first and second control objects overshoot a control target value required from an application.
Figure 7B:
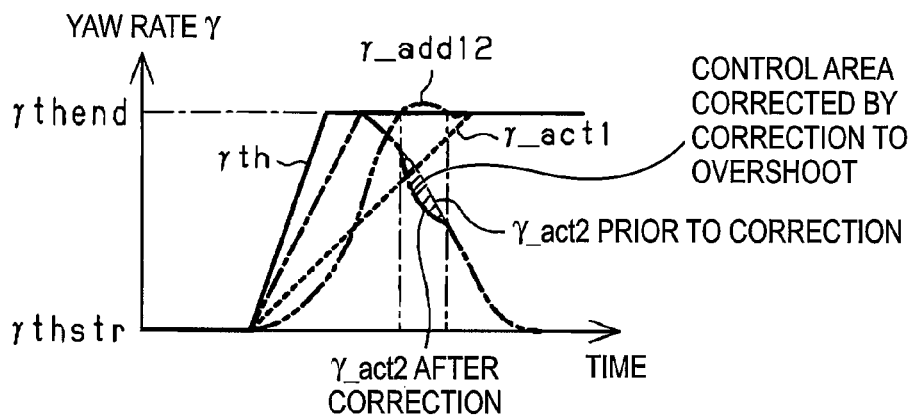
FIG. 7B is a timing chart to explain that a second control requirement value for a second control object is corrected such that an overshooting amount is reduced.

If the information that a summed value of the first movement estimated value and the second movement estimated value overshoots the control target value is input from the second estimated value acquiring section 44, the first requirement value correcting section 433 corrects (adjusts) the second control requirement value calculated in the first requirement value calculating section 432. In the first embodiment, as illustrated in FIGS. 7A and 7B, in the case where a second summed value γ_add12 of the first yaw rate estimated value γs_act1 and the second yaw rate estimated value γs_act2 exceeds the target yaw rate γth, the first requirement correcting section 433 calculates a differential value (an overshoot amount) γ_sub12 between the target yaw rate γth and the second summed value γ_add12. The first requirement value correcting section 433 subtracts a differential value γ_sub12 from the second requirement yaw rate γ_act2 calculated in the first requirement value calculating section 432 or a value close to the differential value γ_sub12, and outputs the subtraction result to the second estimated value acquiring section 44 as the second requirement yaw rate γ_act2 after the correction. Accordingly, in the first embodiment, the second requirement value setting section 43 having the first requirement value calculating section 432 and the first requirement value correcting section 433 functions as the second requirement value setting unit. The second requirement value setting section 43 outputs the determined second requirement yaw rate γ_act2 to the DYC manager 61 of the second activating device 60.

In the first embodiment, the disclosure 'the second summed value γ_add12 overshoots the target yaw rate γth' means that the second summed value γ_add12 becomes from the state smaller than the target yaw rate γth to the state larger than the target yaw rate γth. It also means that the second summed value γ_add12 becomes from the state larger than the target yaw rate γth to the state smaller than the target yaw rate γth. However, the disclosure does not include the case where the second summed value γ_add12 is hunting the target yaw rate γth.

Returning to FIG. 4, the second estimated value acquiring section 44 acquires the second movement estimated value, which is obtained by numerically expressing movement of the vehicle when the second control object is activated based on the second control requirement value set by the second requirement value setting section 43. In the first embodiment, the second estimated value acquiring section 44 acquires a second yaw rate estimated value γs_act2 (the second movement estimated value) as an estimated value of a yaw rate generated in the vehicle, when the second activating device 60 is activated based on the second requirement yaw rate γ_act2 set by the second requirement value setting section 43. The second yaw rate estimated value γs_act2 is estimated based on information output from the vehicle state value acquiring section 24. For example, the second yaw rate estimated value γs_act2 in case of a high vehicle speed becomes a value larger than that in case of a low vehicle speed. The second estimated value acquiring section 44 acquires the second yaw rate estimated value γs_act2 to the second calculating section 45. Accordingly, in the first embodiment, the second estimated value acquiring section 44 functions as a second estimating unit.

The second estimated value acquiring section 44 calculates a summed value of the second yaw rate estimated value γs_act2 and the first yaw rate estimated value γs_act1 that have been acquired as a second summed value γ_add12, and determines whether the second summed value γ_add12 overshoots the target yaw rate γth (refer to FIGS. 7A and 7B). If overshoot is determined, the second estimated value acquiring section 44 commands the first requirement value correcting section 433 to correct (adjust) the second yaw rate estimated value γs_act2.

Figure 8A:
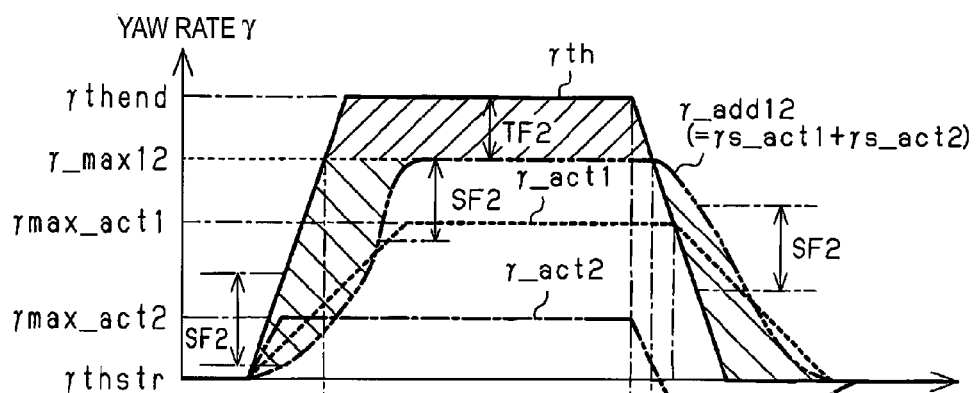
FIG. 8A is a timing chart showing variation of a control target value required from an application, a first control requirement value for a first control object, a second control requirement value for a second control object, and a summed value of movement estimated values of the first and second control objects.

The second calculating section 45 calculates a second stationary shortage amount TF2, which is generated due to limit of output of the first and second control objects with respect to the control target value, and a second estimated delay amount SF2, which is generated based on response delay of the first and second control objects. The second calculating section 45 outputs the second stationary shortage amount TF2 and the second estimated delay amount SF2 that have been calculated, to the third requirement value setting section 46. Accordingly, in the first embodiment, the second calculating section 45 functions as another calculating unit. In the first embodiment, as illustrated in FIG. 8A, the second stationary shortage amount TF2 is a value obtained by subtracting the first summed value γ_max12 from the target yaw rate γth or a value close to the value obtained by the subtraction. The first summed value γ_max12 is a value obtained by summing the output limit value γmax_act1 of the front wheel actuator ACTF (the output limit value of the first control object) (refer to FIG. 3) and the output limit value γmax_act2 of the braking/activating actuator ACTB (the output limit value of the second control object) (refer to FIG. 3). Prior to the first timing t41 or after the third timing t43 when the first summed value γ_max12 is larger than the target yaw rate γth, the second stationary shortage amount TF2 becomes 'zero (0).'

The second estimated delay amount SF2 is calculated based on a differential value between a smaller value of the control target value and the first summed value γ_max12 (i.e., a sum of the output limit values of the first and second control objects) and a sum of the movement estimated values of the first and second control objects. In the first embodiment, since the target yaw rate γth is smaller than the first summed value γ_max12, prior to the first timing t41 illustrated in FIG. 8A, the second estimated delay amount SF2 becomes a value obtained by subtracting the second summed value γ_add12 from the target yaw rate γth or a value close to the value obtained by the subtraction. The second summed value γ_add12 is a value obtained by summing the first yaw rate estimated value γs_act1 and the second yaw rate estimated value γs_act2. Since the first summed value γ_max12 is smaller than the target yaw rate γth, after the first timing t41 and prior to the third timing t43, the second estimated delay amount SF2 becomes a value obtained by subtracting the second summed value γ_add12 from the first summed value γ_max12 or a value close to the value obtained by the subtraction. Since the target yaw rate γth is smaller than the first summed value γ_max12, after the third timing t43, the second estimated delay amount SF2 becomes a value obtained by subtracting the second summed value γ_add12 from the target yaw rate γth or a value close to the value obtained by the subtraction.

Returning to FIG. 4, the third requirement value setting section 46 has a second coefficient calculating section 461, a second requirement value calculating section 462, and a second requirement value correcting section 463. The second coefficient calculating section 461 calculates a second correction coefficient K2 used to correct (adjust) the input second estimated delay amount SF2. The second correction coefficient K2 is a so-called gain set to a value more than or equal to 'zero (0)' and less than or equal to '1,' The second coefficient calculating section 461 outputs the calculated second correction coefficient K2 to the second requirement value calculating section 462. Accordingly, in the first embodiment, the second coefficient calculating section 461 functions as another coefficient setting unit.

Figure 8B:
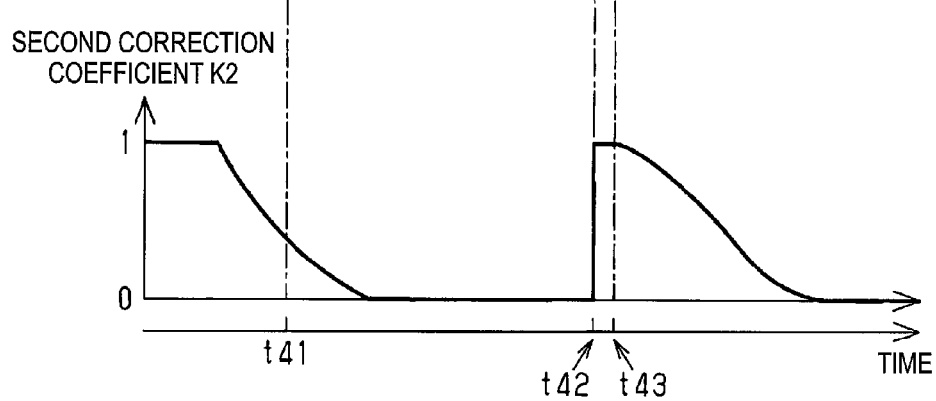
FIG. 8B is a timing chart to explain variation of a second correction coefficient for correcting a third control requirement value.

The method for calculating the second correction coefficient K2 is different in the case where the second stationary shortage amount TF2 is not 'zero (0)' and in the case where the second stationary shortage amount TF2 is 'zero (0).' As illustrated in FIGS. 8A and 8B, in the case where the second stationary shortage amount TF2 is not 'zero (0),' the first summed value γ_max12 (=γmax_act1+γmax_act2) is smaller than the arrival target value γthend of the target yaw rate γth. As such, prior to the second timing t42 when the first direction to be controlled (refer to FIGS. 2A and 2B) is completely converted into the second direction (refer to FIGS. 2A and 2B), the second correction coefficient K2 becomes a value based on a differential value between the first summed value γ_max12 and the second summed value γ_add12. After the second timing t42, the second correction coefficient K2 becomes a value based on a differential value between the second summed value γ_add12 and the starting value γthstr. Specifically, the second correction coefficient K2 is calculated based on the relation expression (math expression 3) set forth hereinafter. However, in the relation expression (math expression 3), values substituted in a control starting value Vstr and the final target value Vend are different prior to and after the second timing t12 illustrated in FIG. 8A.

$$K2 = \frac{|Vend - \gamma\_add12|}{|Vend - Vstr|}$$ [Math Expression 3]

Control prior to the second timing t42 is control to change a yaw rate γ of the vehicle from the starting value γthstr to the arrival target value γthend. As such, prior to the second timing t42, the starting value γthstr is substituted in the control starting value Vstr, and the first summed value γ_max12 (=γmax_act1+γmax_act2) is substituted in the final target value Vend. Control after the second timing t42 is control to change a yaw rate γ of the vehicle from the first summed value γ_max12 (or a value close to the first summed value γ_max12) to the starting value γthstr. As such, after the second timing t12, the first summed value γ_max12 is substituted in the control starting value Vstr, and the starting value γthstr is substituted in the final target value Vend.

Since the front wheel actuator ACTF and the braking/activating actuator ACTB are not yet activated due to response delay prior to the first timing t41, as illustrated in FIGS. 8A and 8B, the second correction coefficient K2 prior to the second timing t42 is set to '1.' Once at least one of the actuators ACTF and ACTB begins to be activated, the second correction coefficient K2 gradually becomes close to 'zero (0).' Since the final target value of the driving control is changed at the second timing t42, the second correction coefficient K2 is set to '1.' Thereafter, as the second summed value γ_add12 (=γs_act1+γs_act2) becomes close to the starting value γthstr of the target yaw rate γth, the second correction coefficient K2 becomes small. When the second summed value γ_add12 reaches the starting value γthstr, the second correction coefficient K2 is set to 'zero (0).'

Figure 9A:
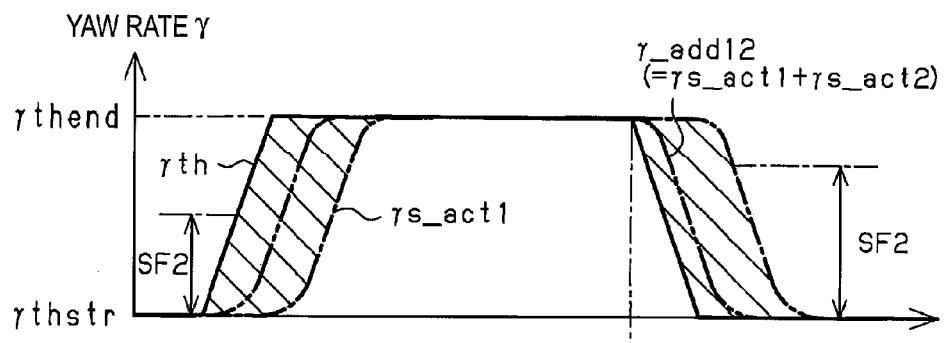
FIG. 9A is a timing chart showing variation of a control target value required from an application, a first control requirement value for a first control object, a second control requirement value for a second control object, and a summed value of movement estimated values of the first and second control objects.

In the case where the second stationary shortage amount TF2 is 'zero (0),' the second correction coefficient K2 becomes a value based on a differential value between the control target value and the summed value of the first estimated delay amount and the second estimated delay amount, as illustrated in FIG. 9A. Specifically, the second correction coefficient K2 is calculated based on the aforementioned relation expression (math expression 3). However, in the relation expression (math expression 3), values substituted in the control starting value Vstr and the final target value Vend are different prior to and after the first timing t51 illustrated in FIGS. 9A and 9B. The first timing t51 is a timing when the direction to be controlled is completely converted from the first direction (refer to FIGS. 2A and 2B) to the second direction (refer to FIGS. 2A and 2B).

Control prior to the first timing t51 is control to change a yaw rate γ of a vehicle from the starting value γthstr to the arrival target value γthend. As such, prior to the first timing t51, the starting value γthstr is substituted in the control starting value Vstr, and the arrival target value γthend is substituted in the final target value Vend. Control after the first timing t51 is control to change a yaw rate γ of the vehicle from the arrival target value γthend (or a value close to the arrival target value γthend) to the starting value γthstr. As such, after the second timing t51, the arrival target value γthend is substituted in the control starting value Vstr, and the starting value γthstr is substituted in the final target value Vend.

Figure 9B:
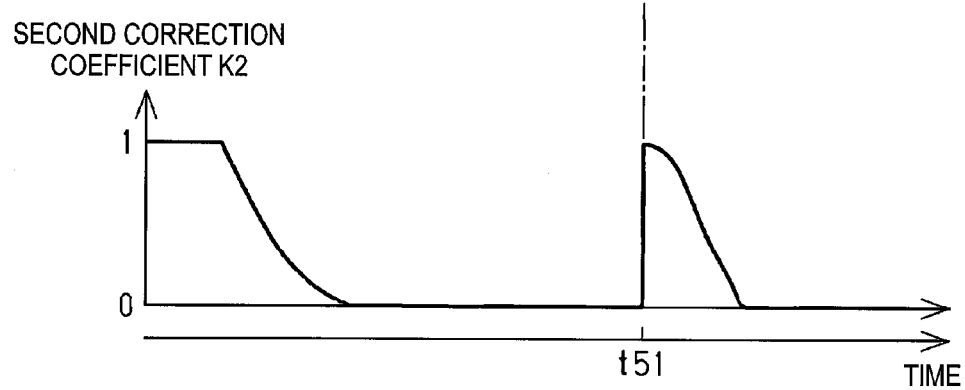
FIG. 9B is a timing chart showing variation of a second correction coefficient for correcting a third control requirement value.

In the case where the front wheel actuator ACTF and the braking/activating actuator ACTB are not yet activated due to response delay, as illustrated in FIGS. 9A and 9B, the second correction coefficient K2 prior to the first timing t51 is set to '1.' Once at least one of the actuators ACTF and ACTB begins to be activated, the second correction coefficient K2 gradually becomes close to 'zero (0).' At the first timing t51, the final target value for control of activating is changed, so that the second correction coefficient K2 is set to '1.' Thereafter, as the second summed value γ_add12 (=γs_act1+γs_act2) becomes close to the starting value γthstr of the target yaw rate γth, the second correction coefficient K2 becomes small. When the second summed value γ_add12 reaches the starting value γthstr, the second correction coefficient K2 is set to 'zero (0).'

Returning to FIG. 4, the second requirement value calculating section 462 sets a third control requirement amount to be required to the third control object, based on at least the second estimated delay amount SF2 among the second stationary shortage amount TF2 and the second estimated delay amount SF2 that have been input from the second calculating section 45, and the input second correction coefficient K2. That is, the third control requirement amount is set to supplement a part of a required control target value that cannot be achieved by output from the first and second control objects, by using output from the third control object. In the first embodiment, the second requirement value calculating section 462 calculates a third requirement yaw rate γ_act3 to be required to the third activating device 70 based on the relation expression (math expression 4) set forth hereinafter. The second requirement value calculating section 462 outputs the calculated third requirement yaw rate γ_act3 to the third estimated value acquiring section 47. In the relation expression (math expression 4), the multiplier n is an integer more than '1,' or may be '1' or a number (e.g., '3') other than '1.'

$$\gamma\_act2 = TF2 + SF2 \times K2^2$$ [Math Expression 4]

Figure 10:
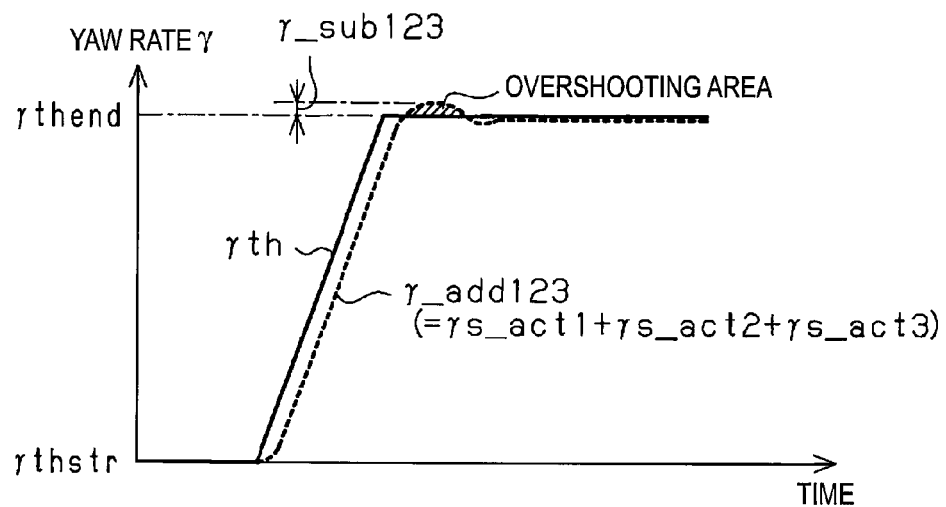
FIG. 10 is a timing chart to explain that a summed value of movement estimated values of first to third control objects overshoots a control target value required from an application.

If the information that a summed value of the first movement estimated value, the second movement estimated value, and the third movement estimated value overshoots the control target value is input from the third estimated value acquiring section 47, the second requirement value correcting section 463 corrects (adjusts) the third control requirement value calculated in the second requirement value calculating section 462. In the first embodiment, as illustrated in FIG. 10, in the case where the third summed value γ_add123 of the first yaw rate estimated value γs_act1, the second yaw rate estimated value γs_act2, and the third yaw rate estimated value γs_act3 exceeds the target yaw rate γth, the second requirement value correcting section 463 calculates a differential value γ_sub123 between the target yaw rate γth and the third summed value γ_add123. The second requirement value correcting section 463 subtracts the differential value γ_sub123 from the third requirement yaw rate γ_act3 calculated in the second requirement value calculating section 462, and outputs the subtraction result to the third estimated value acquiring section 47 as the third requirement yaw rate γ_act3 after the correction. That is, the method for correcting the third requirement yaw rate γ_act3 by means of the second requirement value correcting section 463 is the same as the method for correcting the second requirement yaw rate γ_act2 by means of the first requirement value correcting section 433. Accordingly, in the first embodiment, the third requirement value setting section 46 having the second requirement value calculating section 462 and the second requirement value correcting section 463 functions as a third requirement value setting unit. The third requirement value setting section 46 outputs the determined third requirement yaw rate γ_act2 to the rear steer manager 71 of the third activating device 70.

Returning to FIG. 4, the third estimated value acquiring section 47 acquires a third movement estimated value, which is obtained by numerically expressing movement of the vehicle when the third control object is activated based on the third control requirement value set by the third requirement value setting section 46. In the first embodiment, when the third activating device 70 is activated based on the third requirement yaw rate γ_act3 set by the third requirement value setting section 46, the third estimated value acquiring section 47 acquires the third yaw rate estimated value (the third movement estimated value) γs_act3 as an estimated value of a yaw rate generated in the vehicle. The third yaw rate estimated value γs_act3 is estimated based on information output from the vehicle state value acquiring section 24. For example, the third yaw rate estimated value γs_act3 in case of a high vehicle speed V becomes a value larger than that in case of a low vehicle speed V. The third estimated value acquiring section 47 outputs the third yaw rate estimated value γs_act3 to the estimated yaw rate calculating section 48. Accordingly, in the first embodiment, the third estimated value acquiring section 47 functions as a third estimating unit.

The third estimated value acquiring section 47 calculates a third summed value γ_add123 (=γs_act1+γs_act2+γs_act3), and determines whether the third summed value γ_add123 overshoots the target yaw rate γth (refer to FIG. 10). If overshoot is determined, the third estimated value acquiring section 47 commands the second requirement value correcting section 463 to correct (adjust) the third yaw rate estimated value γs_act3.

The estimated yaw rate calculating section 48 sums the first yaw rate estimated value γs_act1, the second yaw rate estimated value γs_act2, and the third yaw rate estimated value γs_act3 that have been input from the estimated value acquiring sections 41, 44, and 47, respectively. The estimated yaw rate calculating section 48 makes the sum result be an estimated value γs of a yaw rate generated in the vehicle due to activation of each of the activating devices 50, 60, and 70.

Subsequently, a processing routine, which is carried out when the target yaw rate γth is input from the yaw rate converting section 21 into the requirement value setting section 26, will be described based on the flow chart in FIG. 11 and the timing chart in FIG. 12. FIG. 12 is a timing chart in the case where the first stationary shortage amount TF1 becomes 'zero (0).'

In the case where activation of each of the activating devices 50, 60, and 70 is required from the application 30, the processing routine is carried out per predetermined cycle. In the processing routine, the first requirement value setting section 40 sets the first requirement yaw rate γ_act1 (S10), and outputs the set first requirement yaw rate γ_act1 to the front steer manager 51 of the first activating device 50 (S11). Subsequently, the first estimated value acquiring section 41 acquires the first yaw rate estimated value γs_act1 (S12). Accordingly, in the first embodiment, S10 corresponds to a first requirement value setting step, and S12 corresponds to a first estimating step.

The first calculating section 42 calculates the first stationary shortage amount TF1 and the first estimated delay amount SF1 (S13). Specifically, in the case where the output limit value γmax_act1 of the front wheel actuator ACTF (the output limit value of the first control object) exceeds the arrival target value γthend of the target yaw rate γth, the first calculating section 42 makes the first stationary shortage amount TF1 be 'zero (0).' The first calculating section 42 subtracts the first yaw rate estimated value γs_act1 of the front wheel actuator ACTF from the target yaw rate γth, and makes the subtraction result be the first estimated delay amount SF1 (refer to FIG. 6A). In the case where the output limit value γmax_act1 does not exceed the arrival target value γthend, the first calculating section 42 subtracts the output limit value γmax_act1 from the target yaw rate γth, and makes the subtraction result be the first stationary shortage amount TF1. The first calculating section 42 subtracts the first yaw rate estimated value γs_act1 of the front wheel actuator ACTF from the output limit value γmax_act1, and makes the subtraction result be the first estimated delay amount SF1 (refer to FIG. 5A). Accordingly, in the first embodiment, S13 corresponds to a calculating step.

Subsequently, the first coefficient calculating section 431 of the second requirement value setting section 43 calculates the first correction coefficient K1 by using the aforementioned relation expression (math expression 1) (S14). The first requirement value calculating section 432 of the second requirement value setting section 43 corrects the first estimated delay amount SF1 by using the first correction coefficient K1, and makes a value obtained by summing the corrected value (=SF1×K1″) and the first stationary shortage amount TF1 be the second requirement yaw rate γ_act2 (=TF1+SF1×K1″) (S15). Subsequently, the second estimated value acquiring section 44 acquires the second yaw rate estimated value γs_act2 (S16). Accordingly, in the first embodiment, S15 corresponds to a second requirement value setting step, and S16 corresponds to a second estimating step.

Hereinafter, the method for calculating the second requirement yaw rate γ_act2 in S15 will be described. In FIG. 12, the output limit value γmax_act1 of the front wheel actuator ACTF (the output limit value of the first control object) is more than the arrival target value γthend of the target yaw rate γth, namely, the first stationary shortage amount TF1 is 'zero (0).'

If correcting the first estimated delay amount SF1 by using the first correction coefficient K1 is not carried out, there is a possibility that the second summed value γ_add12 (=γs_act1+γs_act2) remarkably exceeds the target yaw rate γth. The overshoot occurs because response of the front wheel actuator ACTF and the braking/activating actuator ACTB to the requirement from the application 30 is late. That is, the braking/activating actuator ACTB begins to be activated slightly late, in response to the requirement from the application 30. As illustrated in FIG. 12, the front wheel actuator ACTF is not yet activated prior to the first timing t61. As such, the braking/activating actuator ACTB is activated such that the second yaw rate estimated value γs_act2 approaches the target yaw rate γth. Thereafter, once the first timing t61 lapses, the front wheel actuator ACTF begins to be activated. In this case, since the first yaw rate estimated value γs_act1 is generated from the front wheel actuator ACTF, the second requirement yaw rate γ_act2 of the braking/activating actuator ACTB begins to be reduced.

However, even though the second requirement yaw rate γ_act2 is reduced, the second yaw rate estimated value γs_act2 does not immediately begin to be reduced. As a result, accompanied by the increase of the first yaw rate estimated value γs_act1, the second summed value γ_add12, which is a summed value of the yaw rate estimated values γs_act1 and γs_act2, remarkably exceeds the target yaw rate γth. In order to restrain the second summed value γ_add12 from overshooting the target yaw rate γth, the second requirement yaw rate γ_act2 needs to be properly corrected after the first yaw rate estimated value γs_act1 begins to become close to the target yaw rate γth.

In the first embodiment, the calculated first estimated delay amount SF1 is corrected by using the first correction coefficient K1. The first correction coefficient K1 is set to '1' prior to a first timing t61 when the front wheel actuator ACTF begins to be activated. As such, prior to the first timing t61, the second summed value γ_add12 (in this case, the second yaw rate estimated value γs_act2) becomes close to the target yaw rate γth at a high pace, as in the case where correcting the first estimated delay amount SF1 by using the first correction coefficient K1 is not carried out.

After the first timing t61, as a differential value between the arrival target value γthend of the target yaw rate γth and the first yaw rate estimated value γs_act1 becomes small, the first correction coefficient K1 becomes small. As such, the second requirement yaw rate γ_act2 becomes drastically small compared to the case where correcting the first estimated delay amount SF1 is not carried out. As a result, the second yaw rate estimated value γs_act2 of the braking/activating actuator ACTB, which is activated based on the second requirement yaw rate γ_act2, becomes drastically small, compared to the case where correcting the first estimated delay amount SF1 is not carried out.

At a second timing t62 when the first yaw rate estimated value γs_act1 reaches the arrival target value γthend of the target yaw rate γth, the first correction coefficient K1 becomes 'zero (0).' As such, in the case where the first stationary shortage amount TF1 is 'zero (0),' the second requirement yaw rate γ_act2 surely becomes 'zero (0).' Accordingly, the overshoot occurring between the first timing t61 and the second timing t62 is restrained to become small.

Thereafter, in the case where the target yaw rate γth is reduced from the arrival target value γthend to the starting value γthstr, each of the requirement yaw rates γ_act1 and γ_act2 begins to be reduced (a third timing t63). In this case, the second yaw rate estimated value γs_act2 of the braking/activating actuator ACTB is reduced, and the first yaw rate estimated value γs_act1 of the front wheel actuator ACTF is maintained, between the third timing t63 and a fourth timing t64. That is, the braking/activating actuator ACTB generates yaw in an opposite direction (the second direction) to the first direction to shut off the yaw generated by the activation of the braking/activating actuator ACTB in the first direction. In this case, the first correction coefficient K1 is set to '1.'

Once the third timing t63 lapses, the first yaw rate estimated value γs_act1 begins to be reduced. In this case, since a differential value between the second summed value γ_add12 and the target yaw rate γth becomes small, the first correction coefficient K1 becomes small. Accordingly, the second yaw rate estimated value γs_act2 drastically becomes close to 'zero (0).' Thereafter, when the first yaw rate estimated value γs_act1 reaches the target yaw rate γth, the first correction coefficient K1 becomes 'zero (0)' (a fifth timing t65). As such, in the case where the first stationary shortage amount TF1 is 'zero (0),' the second requirement yaw rate γ_act2 surely becomes 'zero (0).' Accordingly, the overshoot occurring between the fourth timing t64 and a fifth timing t65 is restrained to become small.

Figure 11:
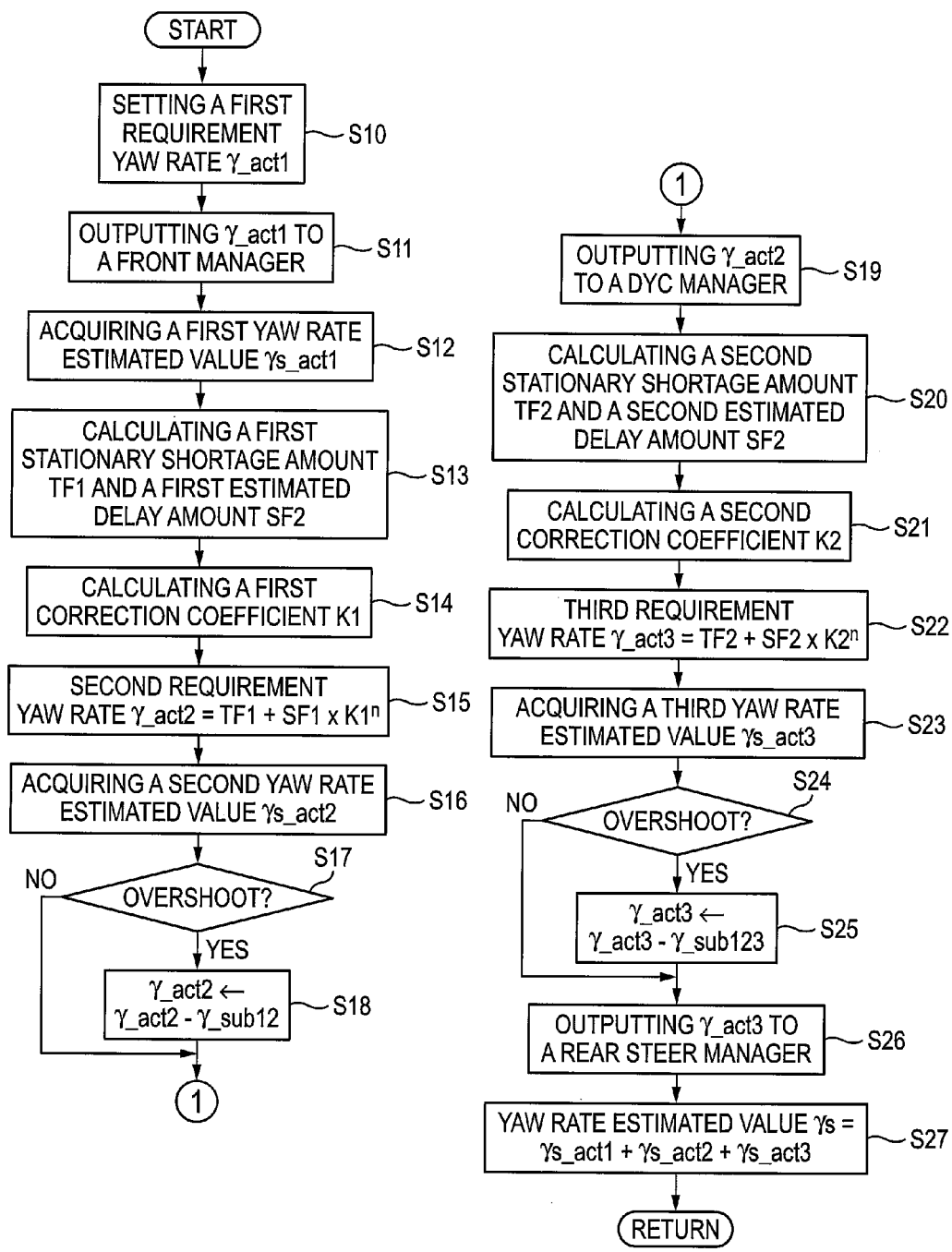
FIG. 11 is a flow chart to explain a processing routine for setting a control requirement value for each control object.
Figure 12:
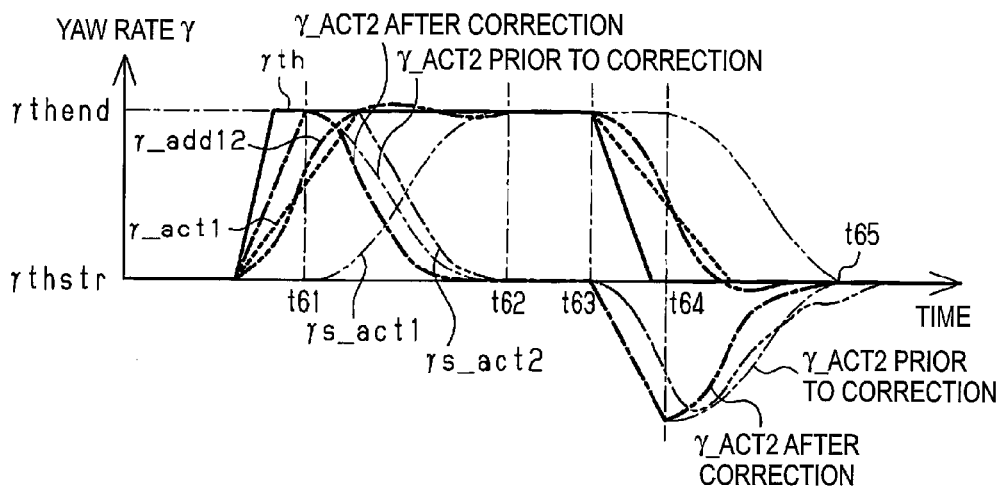
FIG. 12 is a timing chart showing variation of a control target value required from an application, a first control requirement value for a first control object, a second control requirement value for a second control object, and a summed value of movement estimated values of the first and second control objects, in the case where a first estimated delay amount is corrected by a first correction coefficient.

Returning to the flow chart of FIG. 11, the second estimated value acquiring section 44 sums the first yaw rate estimated value γs_act1 acquired in S12 and the second yaw rate estimated value γs_act2 acquired in S16, and makes the sum result be the second summed value γ_add12. The second estimated value acquiring section 44 determines whether the calculated second summed value γ_add12 overshoots the target yaw rate γth (S17). If overshoot does not occur (S17: NO), the second estimated value acquiring section 44 transmits the information to the second requirement value setting section 43 and carries out S19 for a follow-up process, which will be described hereafter.

If overshoot occurs (S17: YES), the first requirement value correcting section 433 of the second requirement value setting section 43 corrects (adjusts) the second requirement yaw rate γ_act2 calculated in S15 (S18). Specifically, the first requirement value correcting section 433 calculates a differential value γ_sub12 between the second summed value γ_add12 and the target yaw rate γth. The first requirement value correcting section 433 subtracts the differential value γ_sub12 from the second requirement yaw rate γ_act2 calculated in S15, and makes the subtraction result (=γ_act2-γ_sub12) be the second requirement yaw rate γ_act2 after the correction (refer to FIGS. 7A and 7B). Thereafter, the second requirement value setting section 43 carries out S19 for a follow-up process.

In S19, the second requirement value setting section 43 outputs the second requirement yaw rate γ_act2 set in S15 or S18 to the DYC manager 61 of the second activating device 60. Subsequently, the second calculating section 45 calculates the second stationary shortage amount TF2 and the second estimated delay amount SF2 (S20). Specifically, if the first summed value γ_max12 (=γmax_act1+γmax_act2) exceeds the arrival target value γthend of the target yaw rate γth, the second calculating section 45 makes the second stationary shortage amount TF2 be 'zero (0).' If the first summed value γ_max12 does not exceed the arrival target value γthend of the target yaw rate γth, the second calculating section 45 subtracts the first summed value γ_max12 from the target yaw rate γth, and makes the subtraction result be the second stationary shortage amount TF2. The second calculating section 45 subtracts the second summed value γ_add12 (=γs_act1+γs_act2) from the target yaw rate γth, and makes the subtraction result be the second estimated delay amount SF2.

Subsequently, the second coefficient calculating section 461 of the third requirement value setting section 46 calculates the second correction coefficient K2, by using the aforementioned relation expression (math expression 3) (S21). The second requirement value calculating section 462 of the third requirement value setting section 46 corrects the second estimated delay amount SF2 by using the second correction coefficient K2, and makes a value obtained by summing the correction value (=SF2×K2″) and the second stationary shortage amount TF2 be the third requirement yaw rate γ_act3 (=TF2+SF2×K2″) (S22). Subsequently, the third estimated value acquiring section 47 acquires the third yaw rate estimated value γs_act3 (S23).

Here, the method for calculating the third requirement yaw rate γ_act3 in S22 will be described.

If correcting the second estimated delay amount SF2 by using the second correction coefficient K2 is not carried out, there is a possibility that the third summed value γ_add123 (=γs_act1+γs_act2+γs_act3) remarkably exceeds the target yaw rate γth. The overshoot occurs because response of the actuators ACTF, ACTB, and ACTR to the requirement from the application 30 is late.

In the first embodiment, the calculated second estimated delay amount SF2 is corrected by using the second correction coefficient K2. In the case where the actuators ACTF and ACTB other than the rear wheel actuator ACTR are not yet activated, namely, the second summed value γ_add12 (=γs_act1+γs_act2) is 'zero (0),' the second correction coefficient K2 is set to '1.' When the second summed value γ_add12 begins to vary, the second correction coefficient K2 gradually becomes small. In the case where the second stationary shortage amount TF2 is 'zero (0),' when the second summed value γ_add12 reaches the target yaw rate γth, the second correction coefficient K2 becomes 'zero (0).' In the case where the second stationary shortage amount TF2 is not 'zero (0),' when the second summed value γ_add12 reaches the first summed value γ_max12 (=γmax_act1+γmax_act2), the second correction coefficient K2 becomes 'zero (0).'

As such, if the other actuators ACTF and ACTB are not activated, the rear wheel actuator ACTR is activated at a high pace to make the third yaw rate estimated value γs_act3 approach the target yaw rate γth. When the other actuators ACTF and ACTB begin to be activated, the second correction coefficient K2 becomes small to restrain the overshoot to become small. As such, the degree of reduction of the third requirement yaw rate γ_act3 becomes large, compared to the case where correcting the second estimated delay amount SF2 by using the second correction coefficient K2 is not carried out. Accordingly, the degree of variation of the third summed value γ_add123 is drastically reduced. As a result, even if the third summed value γ_add123 exceeds the target yaw rate γth, the overshoot amount (=differential value γ_sub123) is small.

The case where a yaw rate γ of the vehicle is 'zero (0),' or a direction of yaw is changed from the first direction to the second direction is substantially equal to the case that has been described. Thus, detailed description of the case is omitted herein.

Returning to the flow chart of FIG. 11, the third estimated value acquiring section 47 sums the yaw rate estimated values γs_act1, γs_act2, and γs_act3 acquired in S12, S16, and S23, respectively, and makes the sum result be the third summed value γ_add123. The third estimated value acquiring section 47 determines whether the calculated third summed value γ_add123 overshoots the target yaw rate γth (S24). If overshoot does not occur (S24: NO), the third estimated value acquiring section 47 transmits the information to the third requirement value setting section 46 and carries out S26 for a follow-up process, which will be described hereafter.

If overshoot occurs (S24: YES), the second requirement value correcting section 463 of the third requirement value setting section 46 corrects (adjusts) the third requirement yaw rate γ_act3 calculated in S22 (S25). Specifically, the second requirement value correcting section 463 calculates a differential value γ_sub123 between the third summed value γ_add123 and the target yaw rate γth (refer to FIG. 10). The second requirement value correcting section 463 subtracts the differential value γ_sub123 from the third requirement yaw rate γ_act3 calculated in S22, and makes the subtraction result (=γ_act3-γ_sub123) be the third requirement yaw rate γ_act3 after the correction. Thereafter, the third requirement value setting section 46 carries out S26 for a follow-up process.

In S26, the third requirement value setting section 46 outputs the third requirement yaw rate γ_act3 set in S22 or S25 to the rear steer manager 71 of the third activating device 70. Subsequently, the estimated yaw rate calculating section 48 sums the acquired yaw rate estimated values γs_act1, γs_act2, and γs_act3, and makes the sum result be the yaw rate estimated value γs (S27). The requirement value setting section 26 finishes the processing routine.

Accordingly, in the first embodiment, the following effects can be accomplished.

(1) In the first activating device 50, the first requirement yaw rate γ_act1 is set based on the input target yaw rate γth. Accordingly, the first yaw rate estimated value γs_act1, which is obtained by numerically expressing movement of the vehicle when the first activating device 50 is activated based on the first requirement yaw rate γ_act1, is acquired, and the first stationary shortage amount TF1 and the first estimated delay amount SF1 are calculated. The second requirement yaw rate γ_act2 for the second activating device 60 is set based on at least the first estimated delay amount SF1 among the first stationary shortage amount TF1 and the first estimated delay amount SF1. That is, the second requirement yaw rate γ_act2 is set to a value supplementing a part that cannot be responded in the first activating device 50. Accordingly, it is possible to properly set control requirement values for the plurality of activating devices for controlling movement of the vehicle.

Once the second requirement yaw rate γ_act2 is set for the second activating device 60, the second yaw rate estimated value γs_act2, which is obtained by numerically expressing movement of the vehicle when the second activating device 60 is activated based on the second requirement yaw rate γ_act2, is acquired. And, it is possible to make the sum result (i.e., γ_add12) of the first yaw rate estimated value γs_act1 and the second yaw rate estimated value γs_act2 approach the input target yaw rate γth. In other words, the plurality of activating devices are incorporated with one another, such that it is possible to make movement of the vehicle approach ideal movement.

(2) As to one of methods for controlling movement of the vehicle by using the plurality of activating devices, a method of setting a control requirement value for one activating device, without considering control requirement values for the other activating devices, is considered. In this case, if design of the actuator included in one activating device is modified, and an output characteristic of the actuator is altered, there would be necessity to re-review the method of setting control requirement values for the other activating devices. That is, an enormous amount of time and costs to construct the system for controlling movement of the vehicle are required.

In the first embodiment, the controller 20 sets a control requirement value for each of the activating devices. Basically, a control requirement value for each of the activating devices is set, such that the requirement from the application 30 is responded in the first activating device, and a control area (the first stationary shortage amount TF1 or the first estimated delay amount SF2) that cannot be responded in the first activating device is responded in the second activating device. As such, even in the case where design of the actuator included in one activating device is modified, it is unnecessary to re-construct a program for setting a control requirement value for each of the activating devices. Accordingly, it is possible to contribute to reduction of costs required to construct the system for controlling movement of the vehicle.

(3) In the case where the output limit value of the front wheel actuator ACTF (the output limit value of the first control object) exceeds the arrival target value γthend of the target yaw rate γth, the first stationary shortage amount TF1 becomes 'zero (0).' As such, the second requirement yaw rate γ_act2 is set based on the first estimated delay amount SF1. In the case where the output limit value γmax_act1 does not exceed the arrival target value γthend, the first stationary shortage amount TF1 is not 'zero (0).' As such, the second requirement yaw rate γ_act2 is set based on the first stationary shortage amount TF1 and the first estimated delay amount SF1. Accordingly, the second requirement yaw rate γ_act2 for the second activating device 60 can be set to an appropriate value in consideration of the target yaw rate γth to be input and the performance of the front wheel actuator ACTF included in the first activating device 50.

(4) The second requirement yaw rate γ_act2 for the second activating device 60 is set based on the first estimated delay amount SF1 caused by response delay of the front wheel actuator ACTF included in the first activating device 50. As such, as output of the front wheel actuator ACTF sufficiently becomes large, there is a case where the second summed value γ_add12 (=γs_act1+γs_act2) overshoots the target yaw rate γth. Accordingly, in the first embodiment, the first correction coefficient K1 is set based on the aforementioned relation expression (math expression 1). The first estimated delay amount SF1 is corrected (adjusted) based on the set first correction coefficient K1. The second requirement yaw rate γ_act2 is set based on the estimated delay amount (=SF1× K1″) after the correction. As a result, the second requirement yaw rate γ_add12 is corrected, before the second summed value γ_add12 reaches the target yaw rate γth. Accordingly, compared to the case where correcting the first estimated delay amount SF1 by using the first correction coefficient K1 is not carried out, it is possible to restrain the second summed value γ_add12 from overshooting the target yaw rate γth.

(5) In the first embodiment, even though the second requirement yaw rate γ_act2 is set based on the first estimated delay amount (=SF1×K1″) corrected by using the first correction coefficient K1, in the case where the second summed value γ_add12 (=γs_act1+γs_act2) overshoots the target yaw rate γth, a process for further correcting the second requirement yaw rate γ_act2 is carried out. Specifically, the differential value γ_sub12 between the second summed value γ_add12 and the target yaw rate γth is calculated. The differential value γ_sub12 is subtracted from the second requirement yaw rate γ_act2. The subtraction result is the second requirement yaw rate γ_act2 after the correction. The second activating device 60 is activated based on the second requirement yaw rate γ_act2 after the correction. As such, it is possible to contribute to further restraining overshoot.

(6) In the first embodiment, once the requirement yaw rates γ_act1 and γ_act2 for the two activating devices 50 and 60 are set, the second stationary shortage amount TF2 and the second estimated delay amount SF2 are calculated. The third requirement yaw rate γ_act3 for the third activating device 70 is set based on at least the second estimated delay amount SF2 among the second stationary shortage amount TF2 and the second estimated delay amount SF2. That is, the third requirement yaw rate γ_act3 is set to a value supplementing a part that cannot be responded in the first and second activating devices 50 and 60. Accordingly, it is possible to properly set control requirement values for the plurality of activating devices for controlling movement of the vehicle. That is, the three activating devices 50, 60, and 70 are cooperated with one another, such that it is possible to make movement of the vehicle approach more ideal movement.

(7) In the case where the first summed value γ_max12 (=γmax_act1+γmax_act2) exceeds the arrival target value γthend of the target yaw rate γth, the second stationary shortage amount TF2 becomes 'zero (0).' As such, the third requirement yaw rate γ_act3 is set based on the second estimated delay amount SF2. In the case where the first summed value γ_max12 does not exceed the arrival target value γthend, the second stationary shortage amount TF2 is not 'zero (0).' As such, the third requirement yaw rate γ_act3 is set based on the second stationary shortage amount TF2 and the second estimated delay amount SF2. Accordingly, the third requirement yaw rate γ_act3 for the third activating device 70 can be set to an appropriate value in consideration of the input target yaw rate γth and the performance of the actuators ACTF and ACTB included in the other activating devices 50 and 60.

(8) The third requirement yaw rate γ_act3 is set based on the second estimated delay amount SF2 caused by response delay of the actuators ACTF and ACTB included in the first and second activating devices 50 and 60. As such, as output of the actuators ACTF and ACTB becomes sufficiently large, there is a case where the third summed value γ_add123 (=γs_act1+ γs_act2+γs_act3) overshoots the target yaw rate γth. Accordingly, in the first embodiment, the second correction coefficient K2 is calculated based on the aforementioned relation expression (math expression 3). The second estimated delay amount SF2 is corrected (adjusted) based on the set second correction coefficient K2. The third requirement yaw rate γ_act3 is set based on the estimated delay amount (=SF2× K2″) after the correction. As a result, the third requirement yaw rate γ_act3 is corrected, before the third summed value γ_add123 reaches the target yaw rate γth. Accordingly, compared to the case where correcting the second estimated delay amount SF2 by using the second correction coefficient K2 is not carried out, it is possible to restrain the third summed value γ_add123 from overshooting the target yaw rate γth.

(9) In the first embodiment, even though the third requirement yaw rate γ_act3 is set based on the second estimated delay amount (=SF2×K2″) corrected by using the second correction coefficient K2, in the case where the third summed value γ_add123 (=γs_act1+γs_act2+γs_act3) overshoots the target yaw rate γth, a process for further correcting the third requirement yaw rate γ_act3 is carried out. Specifically, the differential value γ_sub123 between the third summed value γ_add123 and the target yaw rate γth is calculated. The differential value γ_sub123 is subtracted from the third requirement yaw rate γ_act3. The subtraction result is the third requirement yaw rate γ_act3 after the correction. The third activating device 70 is activated based on the third requirement yaw rate γ_act3. As such, it is possible to contribute to further restraining overshoot.

(10) In case of controlling movement of the vehicle in a forward and backward direction, especially, in case of accelerating the vehicle, an activating source represented by an engine, a motor, or others is generally activated. In case of decelerating the vehicle, a braking source represented by a braking actuator is generally activated. That is, in case of accelerating movement of the vehicle in a forward and backward direction, the direction to be controlled is completely converted, such that a generally used actuator is changed. In case of controlling movement of the vehicle in a lateral direction, the activating devices 50 and 70 for adjusting steering angles of the vehicle wheels 12 and 14 or the activating device 60 capable of separately adjusting a braking/activating force for each of the vehicle wheels of the vehicle is used. The activating devices 50, 60, and 70 are different in terms of their characteristics (a response speed, a control amount, or others), but are effective for controlling movement of the vehicle in a lateral direction.

The activating devices 50, 60, and 70 may be used even in the case where yaw is generated in the vehicle in the first direction, as well as in the case where yaw is generated in the vehicle in the second direction. That is, even though the direction to be controlled is converted from the first direction to the second direction, it is unnecessary to change the generally used activating device (i.e., the first activating device 50). Accordingly, in the first embodiment, the method for setting control requirement values for the activating devices is realized as the method for setting control requirement values for the activating devices 50, 60, and 70 executing control of movement of the vehicle in a lateral direction. By using the three activating devices 50, 60, and 70, it is possible to properly execute control of movement of the vehicle in a lateral direction.

(11) The plurality of activating devices 50, 60, and 70 are cooperated with one another, such that a control area (refer to FIG. 3), which cannot be accomplished in one activating device, can be accomplished. That is, even though a requirement for a fast response speed and a large final target value has been input from the application 30, the activating devices 50, 60, and 70 are cooperated with one another, thereby enabling the vehicle to perform movement close to the requirement.

Second Embodiment

Subsequently, a second embodiment of the present invention will be described with reference to FIGS. 13 and 14. The second embodiment is different from the first embodiment in terms of a method for setting various parameters in the requirement value setting section 26. The differences will be described. Elements identical or corresponding to those in the first embodiment will be denoted by the same reference numerals as those used in the first embodiment, and overlapping descriptions thereof will be omitted.

First, a method for calculating the first stationary shortage amount TF1 and the first estimated shortage amount SF1 to set the second requirement yaw rate $\gamma\_act2$ will be described.

Figure 13:
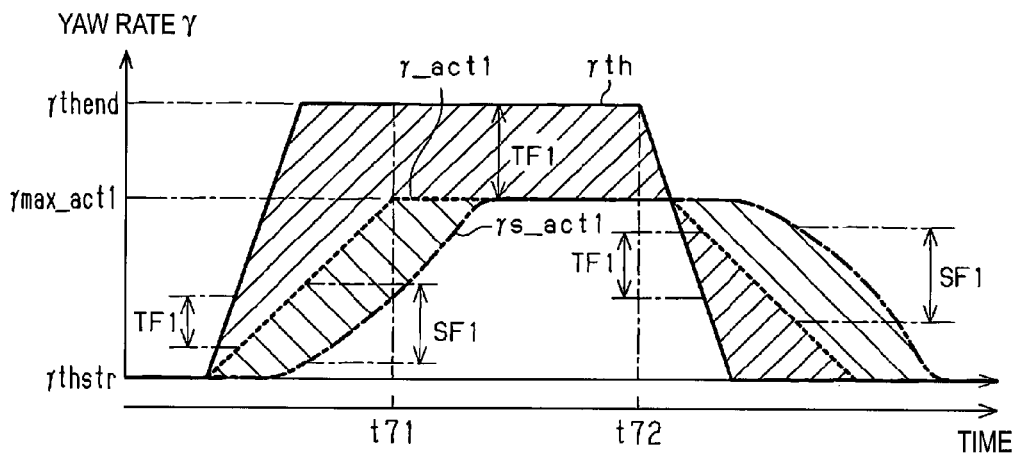
FIG. 13 is a timing chart showing variation of a control target value required from an application, a first control requirement value for a first control object, and a first movement estimated value of the first control object.

As illustrated in FIG. 13, the first calculating section 42 calculates the first stationary shortage amount TF1 and the first estimated shortage amount SF1 by using the same calculation method, regardless of whether the output limit value $\gamma max\_act1$ of the front wheel actuator ACTF (the output limit value of the first control object) and the arrival target value $\gamma$thend of the first requirement yaw rate $\gamma\_act1$ are large or small. Specifically, the first calculating section 42 calculates the first stationary shortage amount TF1 based on the relation expression (math expression 5) set forth below.

However, in the relation expression (math expression 5), a value substituted in the final target value Vend is different prior to and after a second timing t72 presented in FIG. 13.

$$TF1 = Vend - \gamma\_act1 \qquad \text{[Math Expression 5]}$$

Control prior to the second timing t72 is control to change a yaw rate $\gamma$ of the vehicle from the starting value $\gamma$thstr and the arrival target value $\gamma$thend. As such, prior to the second timing t72, the arrival target value $\gamma$thend of the target yaw rate $\gamma$th is substituted in the final target value Vend. Control after the second timing t72 is control to change a yaw rate $\gamma$ of the vehicle from the arrival target value $\gamma$thend to the starting value $\gamma$thstr. As such, after the second timing t72, the starting value $\gamma$thstr is substituted in the final target value Vend.

The first calculating section 42 subtracts the first yaw rate estimated value $\gamma s\_act1$ from the first requirement yaw rate $\gamma\_act1$ for the first activating device 50, and makes the subtraction result be the first estimated delay amount SF1.

Subsequently, a method for calculating the first correction coefficient K1 will be described.

The first coefficient calculating section 431 calculates the first correction coefficient K1 based on the relation expression (math expression 1), as in the first embodiment. That is, control prior to the second timing t72 is control to change a yaw rate $\gamma$ of the vehicle from the starting value $\gamma$thstr to the arrival target value $\gamma$thend. As such, prior to the second timing t72, the starting value $\gamma$thstr is substituted in the control starting value Vstr, and the output limit value $\gamma max\_act1$ of the front wheel actuator ACTF (the output limit value of the first control object) is substituted in the final target value. Control after the second timing t72 is control to change a yaw rate $\gamma$ of the vehicle from the output limit value $\gamma max\_act1$ (or a value close to the output limit value $\gamma max\_act1$) to the starting value $\gamma$thstr. As such, after the second timing t72, the output limit value $\gamma max\_act1$ is substituted in the control starting value Vstr, and the starting value $\gamma$thstr is substituted in the final target value Vend.

As such, prior to the first timing t71 when the first requirement yaw rate $\gamma\_act1$ reaches the output limit value $\gamma max\_act1$ of the front wheel actuator ACTF (the output limit value of the first control object), the first correction coefficient K1 is set to a small value as the first yaw rate estimated value $\gamma s\_act1$ of the first activating device 50 is close to the output limit value $\gamma max\_act1$. Since the first yaw rate estimated value $\gamma s\_act1$ is the same as the output limit value $\gamma max\_act1$, between the first timing t71 and the second timing t72, the first correction coefficient K1 is set to 'zero (0).' After the second timing t72, as the first yaw rate estimated value $\gamma s\_act1$ is close to the starting value $\gamma$thstr, the first correction coefficient K1 becomes small.

Figure 14A:
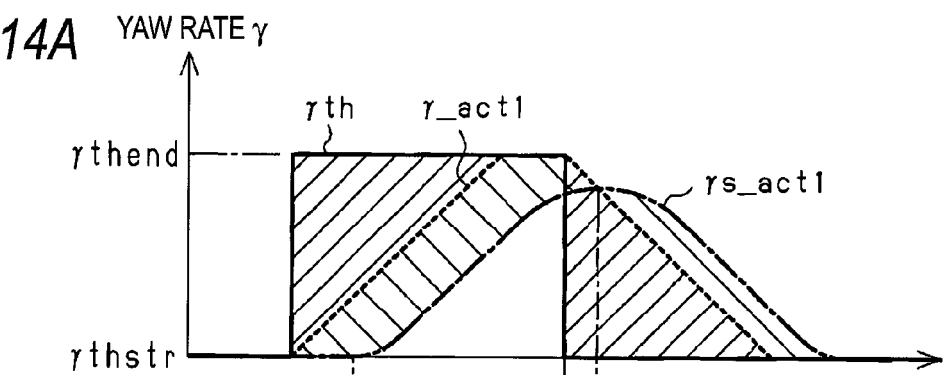
FIG. 14A is a timing chart showing variation of a control target value required from an application, a first control requirement value for a first control object, a first movement estimated value of a first control object.
Figure 14B:
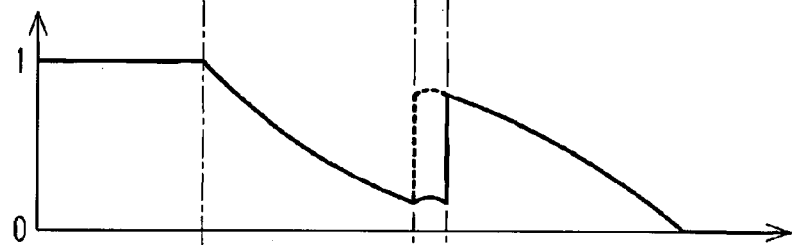
FIG. 14B is a timing chart showing variation of a first correction coefficient for correcting a second control requirement value.

However, there is a case where the application 30 requires variation of a yaw rate $\gamma$ presented in FIG. 14A. When the target yaw rate $\gamma$th drastically varies (especially, when a direction of yaw generated in the vehicle is changed), there is a case where the first yaw rate estimated value $\gamma s\_act1$ becomes a value between the target yaw rate $\gamma$th and the first requirement yaw rate $\gamma\_act1$, as illustrated in FIG. 14A. In the second embodiment, as illustrated in FIG. 14B, the first correction coefficient K1 remains a value calculated immediately prior to a first timing t81, during a period of time from the first timing t81 and a second timing t82 when the first yaw rate estimated value $\gamma s\_act1$ becomes a value between the target yaw rate $\gamma$th and the first requirement yaw rate $\gamma\_act1$. That is, the first correction coefficient K1 is not changed until the first estimated delay amount SF1 becomes 'zero (0).'

When the first correction coefficient K1 is calculated by using the aforementioned relation expression (math expression 1), between the first timing t81 and the second timing t82, as presented by a dashed line in FIG. 14B, the following problems would occur.

Figure 14C:
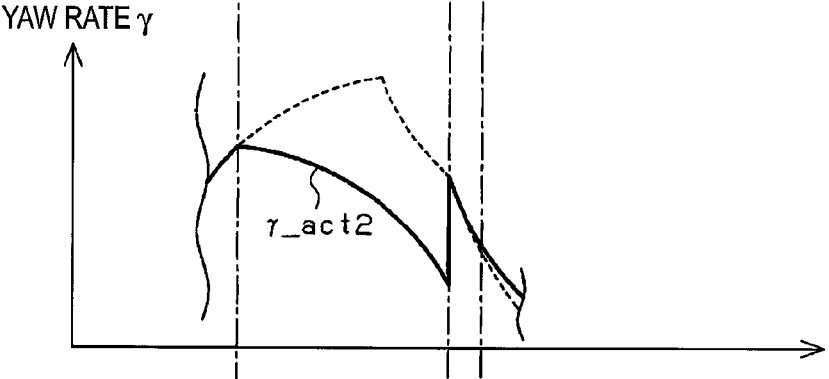
FIGS. 14C and 14D are timing charts showing variation of a first estimated delay amount after correction.

That is, as shown in FIG. 14B, the first correction coefficient K1 drastically becomes large at the first timing t81 when the target yaw rate $\gamma$th becomes 'zero (0).' As such, as shown in FIG. 14C, the first estimated delay amount (SF1×K1″) that has been corrected by using the correction coefficient K1 drastically becomes large at the first timing t81. In this case, if the absolute value of the first stationary shortage amount TF1 ($\leqq 0$ (zero)) to rotate the vehicle in the second direction is smaller than the absolute value of the first estimated delay amount SF1 ($\geqq 0$ (zero)) after the correction, the second requirement yaw rate $\gamma\_act2$ for the second activating device 60 becomes a plus value. Accordingly, the second activating device 60 is activated to generate a large yaw in the first direction, contrary to the requirement from the application 30. As a result, the vehicle would be rotated in an opposite direction to the required direction, thereby causing significant anxiety to a person who takes in the vehicle.

Figure 14D:
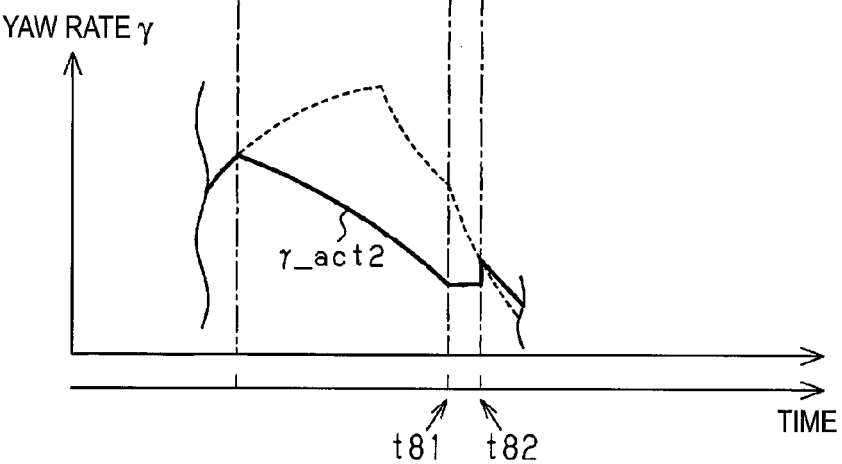

In the second embodiment, as illustrated in FIG. 14B, the first correction coefficient K1 is maintained between the first timing t81 and the second timing t82. As such, as shown in FIG. 14D, the second requirement yaw rate γ_act2 does not become large at the first timing t81.

In the second embodiment, the first correction coefficient K1 drastically become large at the second timing t82. However, at the second timing t82, the first estimated delay amount SF1 (=γ_act1-γs_act1) becomes 'zero (0).' As such, the first estimated delay amount SF1 calculated at the present timing is avoided from drastically becoming a large value than the first estimated delay amount SF1 calculated at the previous timing.

Accordingly, in addition to the effects (1), (2), and (4) to (11) of the first embodiment, in the second embodiment, the following effects can be obtained.

(12) In the second embodiment, the methods for calculating the first stationary shortage amount TF1 and the first estimated shortage amount SF1 are the same, regardless of whether the output limit value γmax_act1 of the front wheel actuator ACTF (the output limit value of the first control object) and the arrival target value γthend of the target yaw rate γth are large or small. As such, compared to the case where the calculation method varies depending on whether the output limit value γmax_act1 and the arrival target value γthend are large or small, control load in the controller 20 can be reduced.

(13) There is a case where the application 30 makes a requirement to make a yaw rate γ of the vehicle become 'zero (0),' and change a direction, in which yaw is generated, from the first direction to the second direction. If the target yaw rate γth has drastically varied, there is a case where the first yaw rate estimated value γs_act1 is positioned between the target yaw rate γth and the first requirement yaw rate γ_act1. In this case, the first correction coefficient K1 is maintained (refer to FIG. 14B). As such, even in the case where the first yaw rate estimated value γs_act1 is positioned between the target yaw rate γth and the first requirement yaw rate γ_act1, unlike the case where calculating the first correction coefficient K1 by using the aforementioned relation expression (math expression 1) is permitted, activating the second activating device 60 can be restrained such that yaw in a different direction from the requirement of the application 30 can be generated. Accordingly, it is possible to avoid causing significant anxiety to a person who takes in the vehicle.

The first and second embodiments may be modified as set forth below. In each of the embodiments, the third requirement value setting section 46 may not have the second requirement value correcting section 463. In this case, even if the third summed value γ_add123 (refer to FIG. 10) overshoots the target yaw rate γth, the third yaw rate estimated value γs_act3 calculated by the second requirement value calculating section 462 is output to the rear steer manager 71 of the third activating device 70.

In each of the embodiments, the third requirement setting section 46 may not correct the second estimated delay amount SF2 calculated in the second calculating section 45 by using the second correction coefficient K2. In this case, a result of sum of the second stationary shortage amount TF2 and the second estimated delay amount SF2 is output as the third yaw rate estimated value γs_act3 to the third estimated value acquiring section 47. Even with the configuration, if the third estimated value acquiring section 47 determines that the third summed value γ_add123 (refer to FIG. 10) overshoots the target yaw rate γth, the third yaw rate estimated value γs_act3 corrected by the second requirement value correcting section 463 is output to the rear steer manager 71 of the third activating device 70.

In each of the embodiment, the requirement from the application 30 is responded in the three activating devices 50, 60, and 70. However, a vehicle may not have the third activating device 70. In this case, the requirement from the application 30 may be responded in the first and second activating devices 50 and 60. Of course, in case of a vehicle having the three activating devices 50, 60, and 70, the requirement from the application 30 may be responded in the two activating devices.

In each of the embodiments, the output limit value of the control object is a maximum value of output of the actuator included in the control object. However, there is a case where the output limit value of the control object is not a maximum value of output of the actuator. For example, there is a case where output of the actuator is restrained, due to ability of a power source supplying power to the actuator or variation of the ability. If output of the actuator is restrained due to various factors, the output limit value of the control object is set to a proper value responding to the factors, e.g., a maximum value of output of the actuator at that time.

In each of the embodiments, the second requirement value setting section 43 may not have the first requirement value correcting section 433. In this case, even if the second summed value γ_add12 (refer to FIGS. 7A and 7B) overshoots the target yaw rate γth, the second yaw rate estimated value γs_act2 calculated by the first requirement value calculating section 432 is output to the DYC manager 61 of the second activating device 60.

In each of the embodiments, the second requirement setting section 43 may not correct the first estimated delay amount SF1 calculated in the first calculating section 42 by using the first correction coefficient K1. In this case, in the first requirement value calculating section 432, a summed value of the first stationary shortage amount TF1 and the first estimated delay amount SF1 is output as the second yaw rate estimated value γs_act2 to the second estimated value acquiring section 44. Even with the configuration, if the second estimated value acquiring section 44 determines that the second summed value γ_add12 (refer to FIGS. 7A and 7B) overshoots the target yaw rate γth, the second yaw rate estimated value γs_act2 corrected by the first requirement value correcting section 433 is output to the rear steer manager 71 of the third activating device 70.

There is a case where a driver of the vehicle steers the steering 11, at the time when the application 30 makes a requirement. In this case, a yaw rate corresponding to the steering angle generated in the vehicle due to the steering of the steering 11 is subtracted from the target yaw rate required from the application 30. Based on the target yaw rate γth after the processing, the requirement yaw rates γ_act1, γ_act2, and γ_act3 for the activating devices 50, 60, and 70 may be set. With this configuration, the activating devices 50, 60, and 70 are activated in accordance with the vehicle operation by the driver, for the requirement from the application 30.

In each of the embodiments, the controller 20 is provided separately from ECU 52, 62, and 72 provided in the actuators ACTF, ACTB, and ACTR, respectively. However, any one of ECU 52, 62, and 72 may function as the controller 20. For example, if ECU 62 for the braking/activating actuator ACTB functions as the controller 20, control requirement values are output from the second activating device 60 to the other activating devices 50 and 70.

In each of the embodiments, any one of ECU 52 and 53 of the first activating device 50 may also function as the front steer manager 51. Likewise, ECU 62 of the second activating device 60 may also function as the DYC manager 61, and ECU 72 of the third activating device 70 may also function as the rear steer manager 71.

In each of the embodiments, ECU 52, 53, 62, and 72 are provided in each of the actuators ACTS, ACTF, ACTB, and ACTR. However, one ECU may control each of the actuators ACTS, ACTF, ACTB, and ACTR.

In each of the embodiments, the control objects of the vehicle are realized as the control objects for controlling movement of the vehicle in a lateral direction. However, for example, the control objects of the vehicle may be realized as the control objects for controlling movement of the vehicle in a forward and backward direction. In this case, the actuators provided in the control objects include an engine functioning as a vehicle activating source, a first motor, an automatic transmission, a braking actuator, a parking brake, and a second motor capable of applying a regenerative brake to the vehicle wheels 12 and 14. The first motor functioning as an activating source may also function as the second motor capable of applying a regenerative brake to the vehicle wheels 12 and 14.

What is claimed is:

1. A vehicle movement control apparatus for setting control requirement values for a plurality of control objects capable of controlling movement of a vehicle, if control target values for movement of the vehicle are input, the apparatus comprising:
    a first requirement value setting unit configured to set a first control requirement value for a first control object of the control objects;
    a first estimating unit configured to acquire a first movement estimated value obtained by numerically expressing movement of the vehicle if the first control object is activated based on the set first control requirement value;
    a calculating processor configured to calculate at least an estimated delay amount among a stationary shortage amount, which is a shortage amount, to the control target value, generated due to limit of output of the first control object, and the estimated delay amount, which is a shortage amount generated based on response delay of the first control object;
    a second requirement value setting unit configured to set a second control requirement value for a second control object among the control objects, based on the result of the calculation by the calculating unit; and
    a second estimating unit configured to acquire a second movement estimated value obtained by numerically expressing movement of the vehicle if the second control object is activated based on the set second control requirement value.

2. The vehicle movement control apparatus according to claim 1, wherein the calculating unit:
    subtracts a first control requirement value set by the first requirement value setting unit from the control target value, and makes a value based on the subtraction result be the stationary shortage amount; and
    subtracts a first movement estimated value acquired by the first estimating unit from the first control requirement value set by the first requirement value setting unit, and makes a value based on the subtraction result be the estimated delay amount.

3. The vehicle movement control apparatus according to claim 2 further comprising a coefficient setting unit configured to set a correction coefficient, which is more than or equal to 'zero (0)' and less than or equal to '1,'
    wherein the coefficient setting unit:
        acquires a final target value of a first control requirement value to be required to the first control object, which is activated upon input of the control target value, and
        sets, in the case where a differential value between the final target value of the first control requirement value and the first movement estimated value acquired by the first estimating unit is small, the correction coefficient to a value smaller than that in the case where the differential value is large, and
    the second requirement value setting unit corrects the estimated delay amount calculated by the calculating unit, based on the set correction coefficient, and
    sets a second control requirement value based on the estimated delay amount after the correction and the stationary shortage amount calculated by the calculating unit.

4. The vehicle movement control apparatus according to claim 3,
    wherein the coefficient setting unit maintains the correction coefficient, in the case where the first movement estimated value acquired by the first estimating unit is a value between the control target value and the first control requirement value set by the first requirement value setting unit.

5. The vehicle movement control apparatus according to claim 1,
    wherein the calculating unit:
    calculates the stationary shortage amount based on a differential value between the control target value and an output limit value of the first control object; and
    calculates the estimated delay amount based on a differential value between a smaller value of the output limit value of the first control object and the control target value, and the first movement estimated value acquired by the first estimating unit.

6. The vehicle movement control apparatus according to claim 5,
    wherein the calculating unit:
    makes the stationary shortage amount be 'zero (0)' and calculates the estimated delay amount based on a differential value between the control target value and the first movement estimated value acquired by the first estimating unit, in the case where the output limit value of the first control object can exceed the final target value of the control target value; and
    calculates the estimated delay amount based on a differential value between a smaller value of the output limit value of the first control object and the control target value, and the first movement estimated value acquired by the first estimating unit, in the case where the output limit value of the first control object cannot exceed the final target value of the control target value.

7. The vehicle movement control apparatus according to claim 6 further comprising a coefficient setting unit configured to set the correction coefficient, which is more than or equal to 'zero (0)' and less than or equal to '1,'
    wherein the coefficient setting unit sets, in the case where a differential value between a smaller value of the final target value of the control target value and the output limit value of the first control object, and the first movement estimated value acquired by the first estimating unit is small, the correction coefficient to a value smaller than that in the case where the differential value is large; and the second requirement value setting unit:
corrects the estimated delay amount calculated by the calculating unit by using the correction coefficient set by the coefficient setting unit, and
sets the second control requirement value based on the estimated delay amount after the correction.

8. The vehicle movement control apparatus according to claim 1,
wherein the second requirement value setting unit corrects a second control requirement value such that an absolute value becomes small, in the case where a summed value of the movement estimated values acquired by the estimating unit overshoots the control target value.

9. The vehicle movement control apparatus according to claim 1 further comprising:
another calculating unit configured to calculate at least an estimated delay amount among a stationary shortage amount, which is a shortage amount, to the control target value, generated due to limit of output of each of the first and second control objects, and the estimated delay amount generated based on response delay of each of the first and second control objects, and
a third requirement value setting unit configured to set a third control requirement value for a third control object among the control objects based on the result of the calculation by the calculating unit.

10. The vehicle movement control apparatus according to claim 9, wherein the calculating unit:
makes a summed result of the output limit values of the first and second control objects be a first summed value, and calculates the stationary shortage amount based on a differential value between the first summed value and the control target value,
makes a summed value of the first movement estimated value acquired by the first estimating unit and the second movement estimated value acquired by the second estimating unit be a second summed value, and
calculates the estimated delay amount based on a differential value between a smaller value of the control object value and the first summed value, and the second summed value.

11. The vehicle movement control apparatus according to claim 10 further comprising another coefficient setting unit configured to set a correction coefficient, which is more than or equal to 'zero (0)' and less than or equal to '1,'
the coefficient setting unit sets, in the case where a differential value between a smaller value of the final target value of the control target value and the first summed value, and the second summed value is small, a correction coefficient to a value smaller than that in the case where the differential value is large, and
the third requirement value setting unit corrects the estimated delay amount calculated by the calculating unit, based on the correction coefficient set by the coefficient setting unit, and
sets a third control requirement value based on the estimated delay amount after the correction.

12. The vehicle movement control apparatus according to claim 9, wherein the third requirement setting unit corrects a third control requirement value such that an absolute value becomes small, in the case where a summed value of the movement estimated values acquired by the estimating unit overshoots the control target value.

13. The vehicle movement control apparatus according to claim 1, wherein
the control target value is a value set to move the vehicle in a lateral direction, and
the control objects are control objects capable of applying a force for moving the vehicle in a lateral direction to the vehicle.

14. A vehicle movement control method for controlling movement of a vehicle by setting control requirement values for a plurality of control objects capable of controlling movement of the vehicle, upon input of a control target value for movement of the vehicle, the method comprising:
setting a first control requirement value for a first control object among the control objects,
acquiring a first movement estimated value obtained by numerically expressing movement of the vehicle if the first control object is activated based on the first control requirement value,
calculating at least an estimated delay amount among a stationary shortage amount, which is a shortage amount, to the control target value, generated due to limit of output of the first control object and the estimated delay amount generated based on response delay of the first control object,
setting a second control requirement value for a second control object among the control objects, based on the calculated result, and
acquiring the second movement estimated value obtained by numerically expressing movement of the vehicle if the second control object is activated based on the second control requirement value.

* * * * *